May 26, 1925.
J. A. SEYMOUR
1,539,060
MANEUVERING MECHANISM FOR INTERNAL COMBUSTION ENGINES
Filed March 15, 1924    10 Sheets-Sheet 1
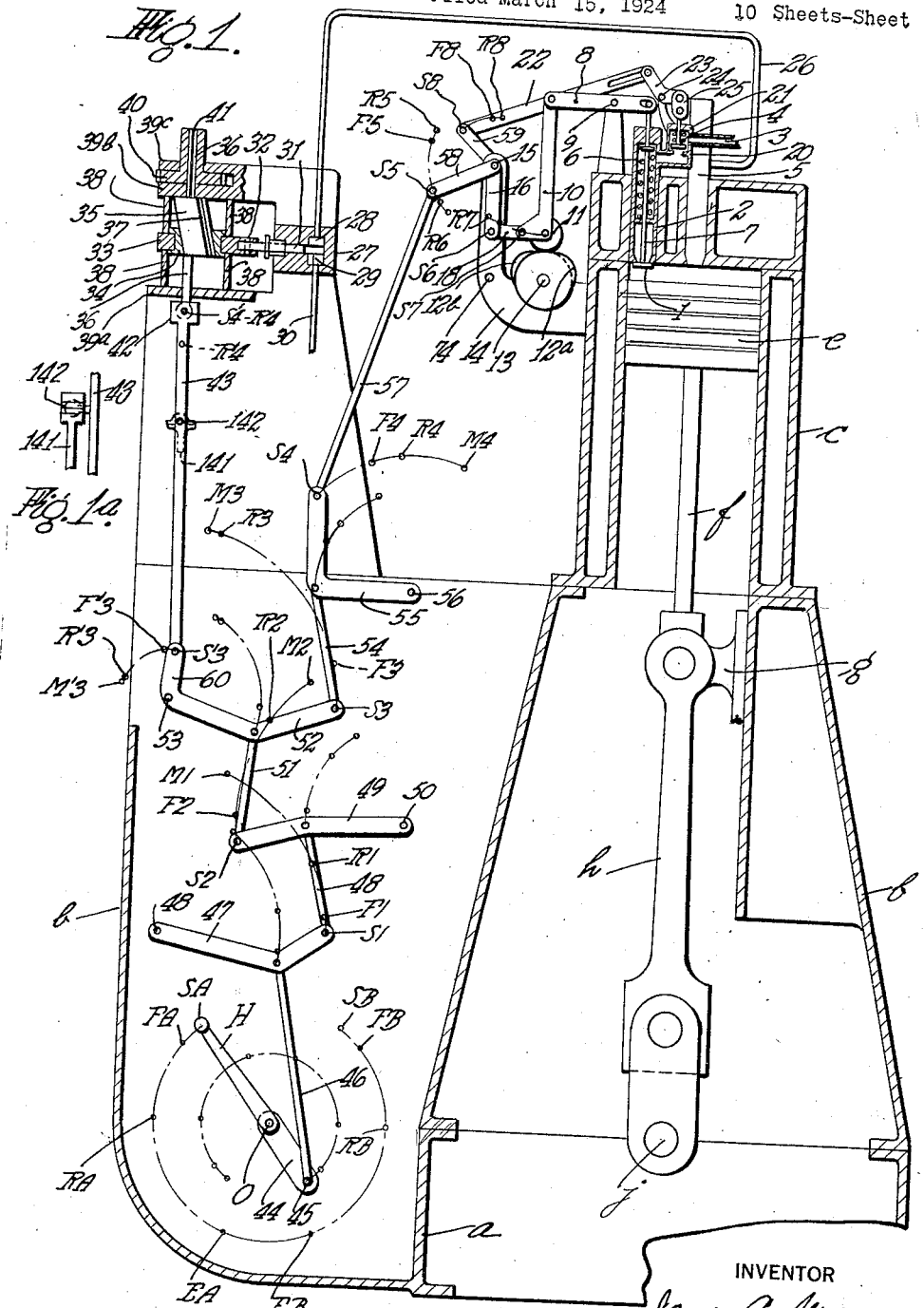
INVENTOR
James A. Seymour
BY Chapin Neal
ATTORNEYS

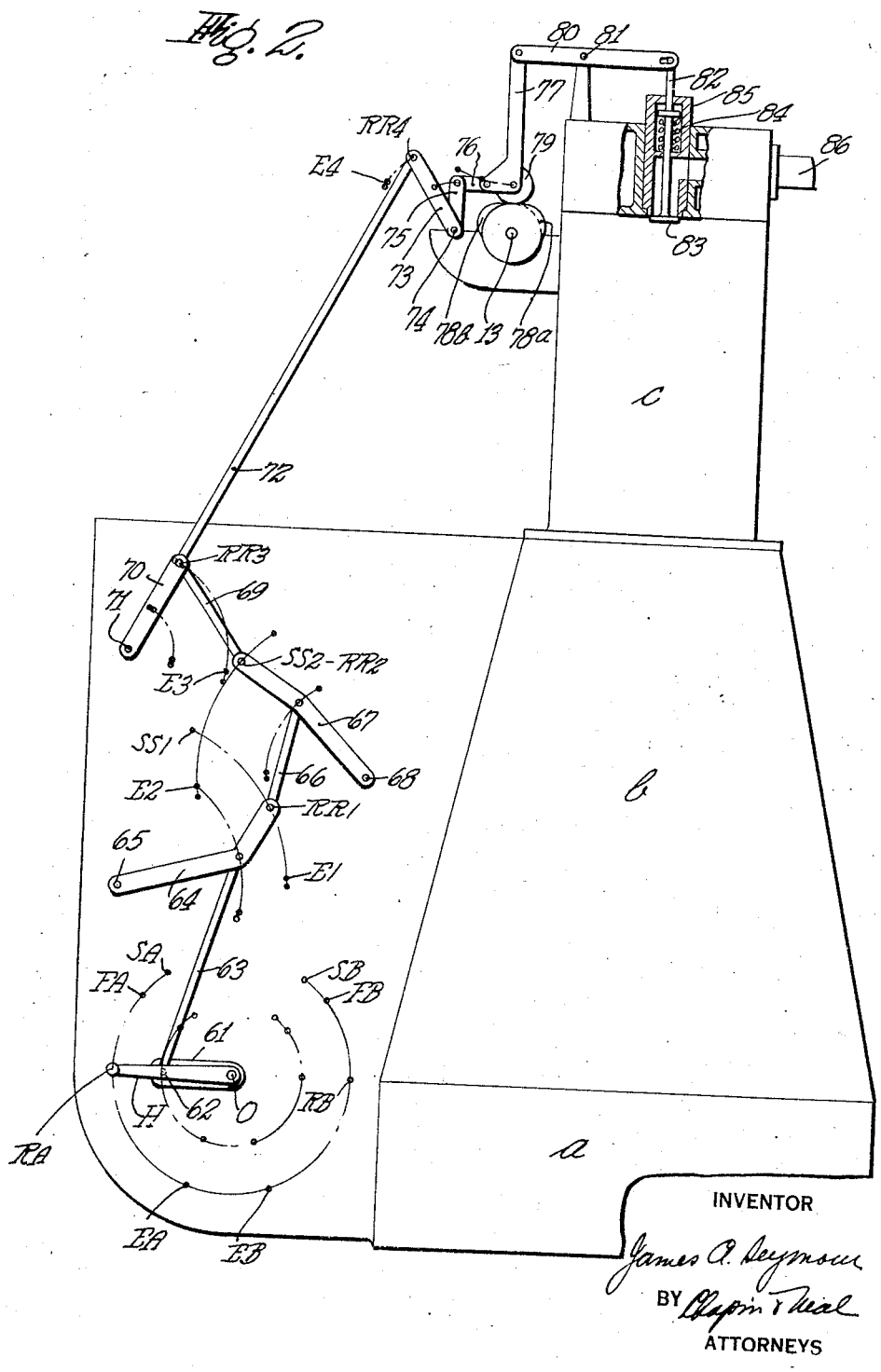

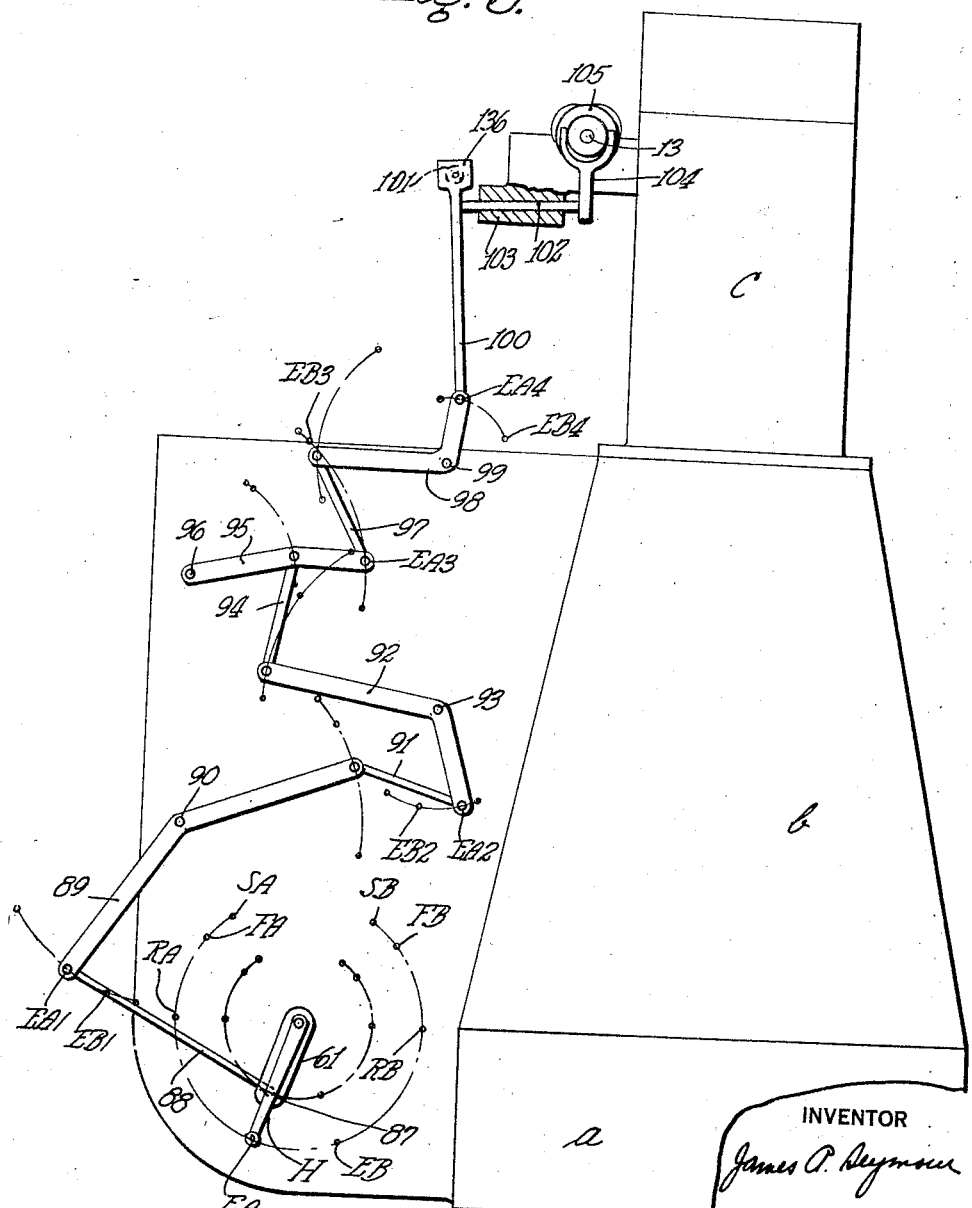

May 26, 1925.
J. A. SEYMOUR
1,539,060
MANEUVERING MECHANISM FOR INTERNAL COMBUSTION ENGINES
Filed March 15, 1924   10 Sheets-Sheet 4
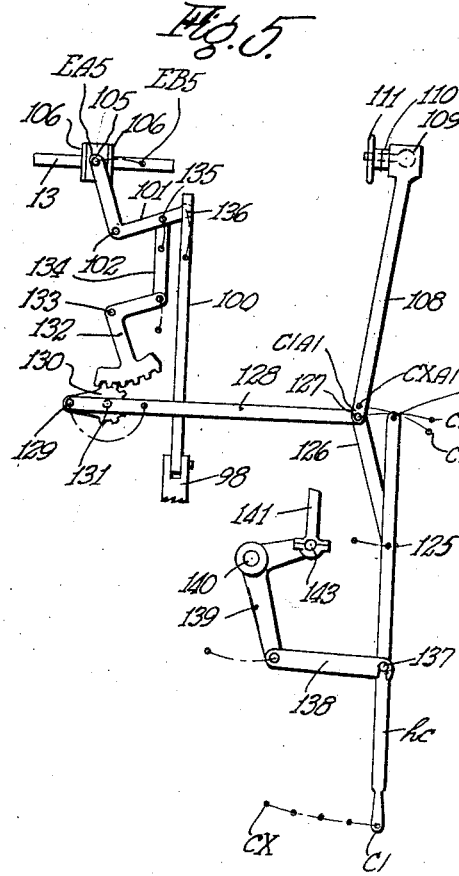
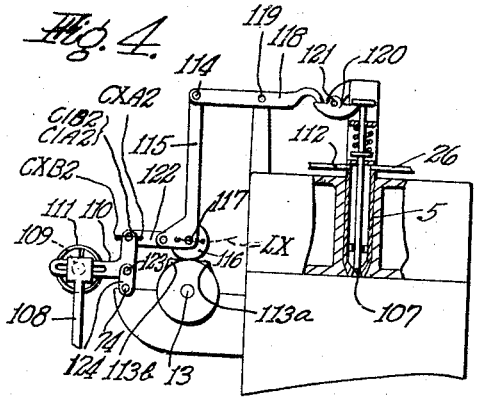
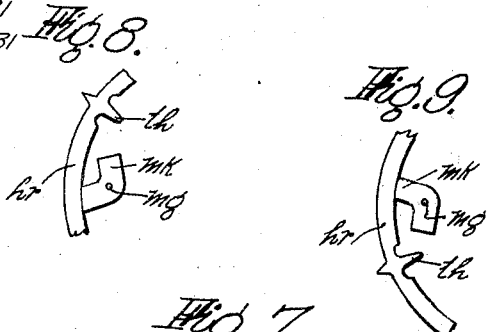
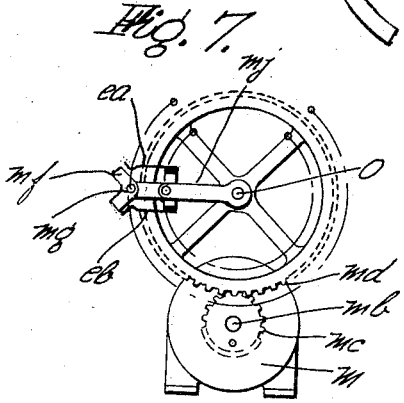
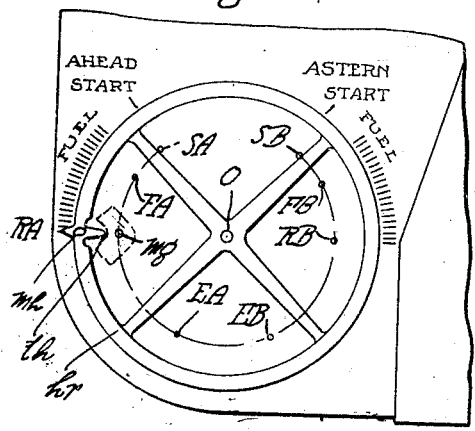
INVENTOR
James A. Seymour
BY Chapin Neal
ATTORNEYS

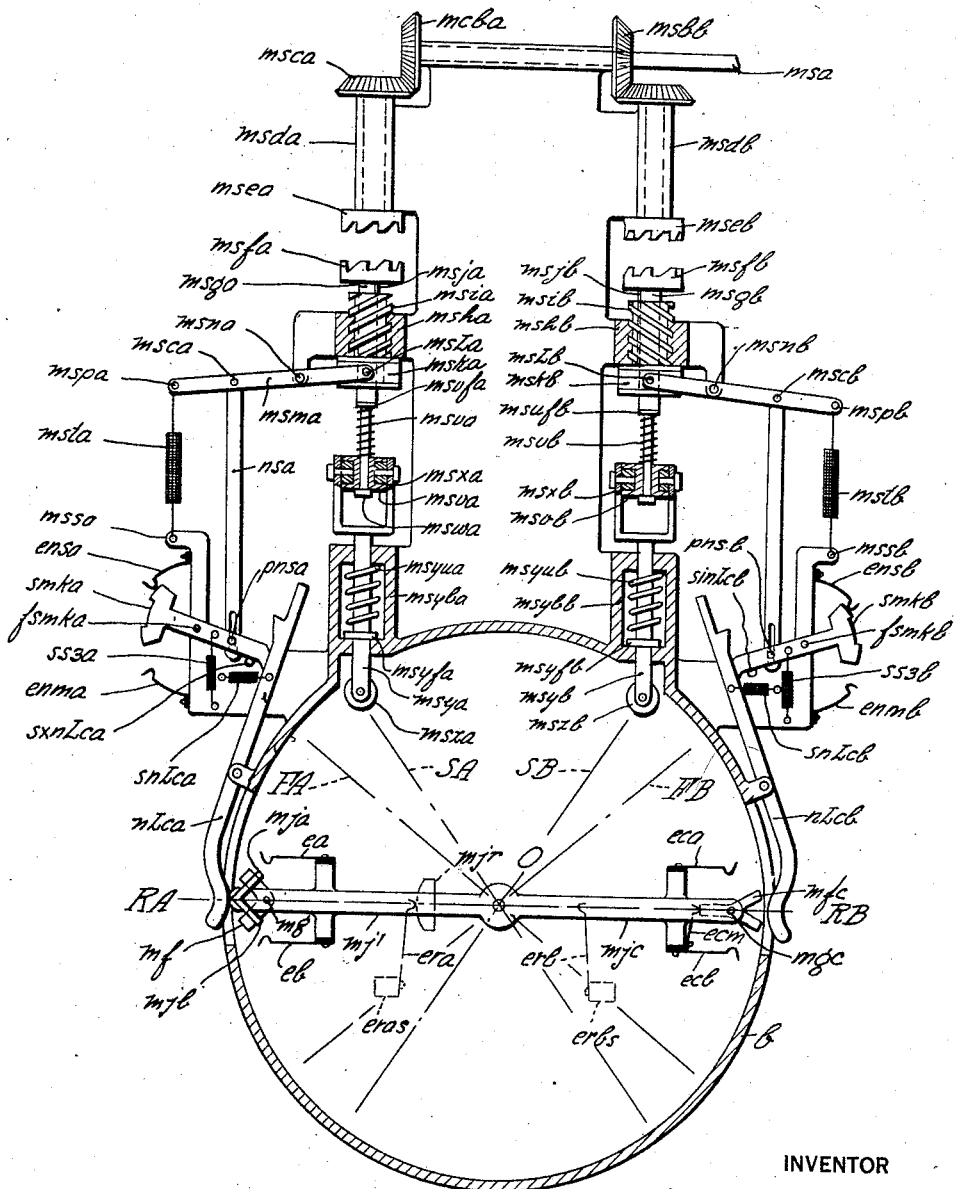

May 26, 1925.
J. A. SEYMOUR
1,539,060
MANEUVERING MECHANISM FOR INTERNAL COMBUSTION ENGINES
Filed March 15, 1924  10 Sheets-Sheet 6
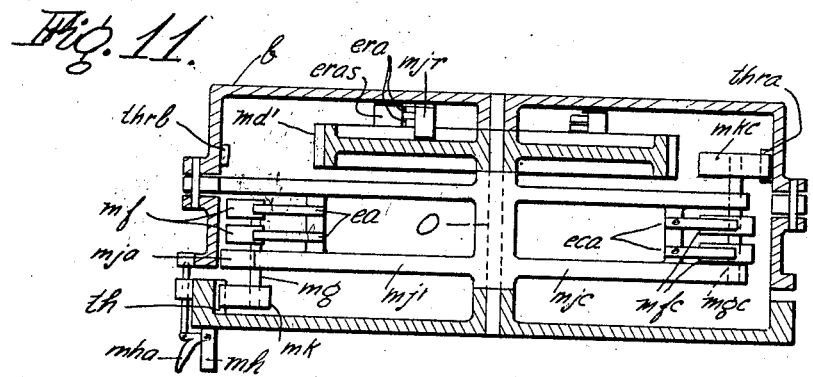
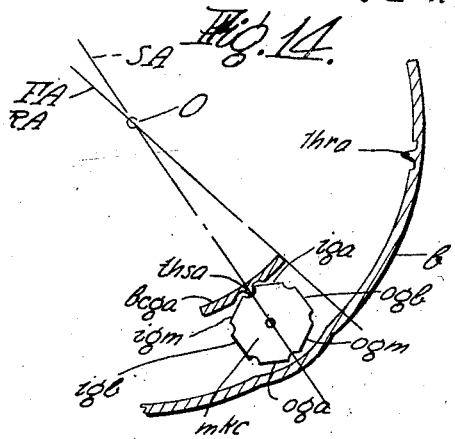
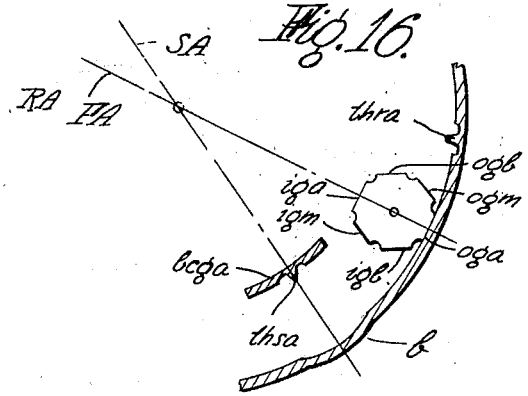
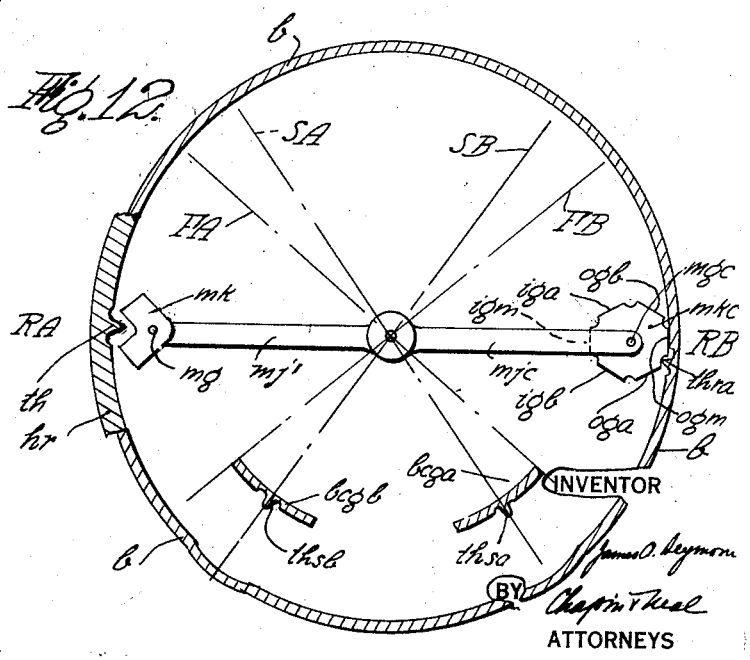

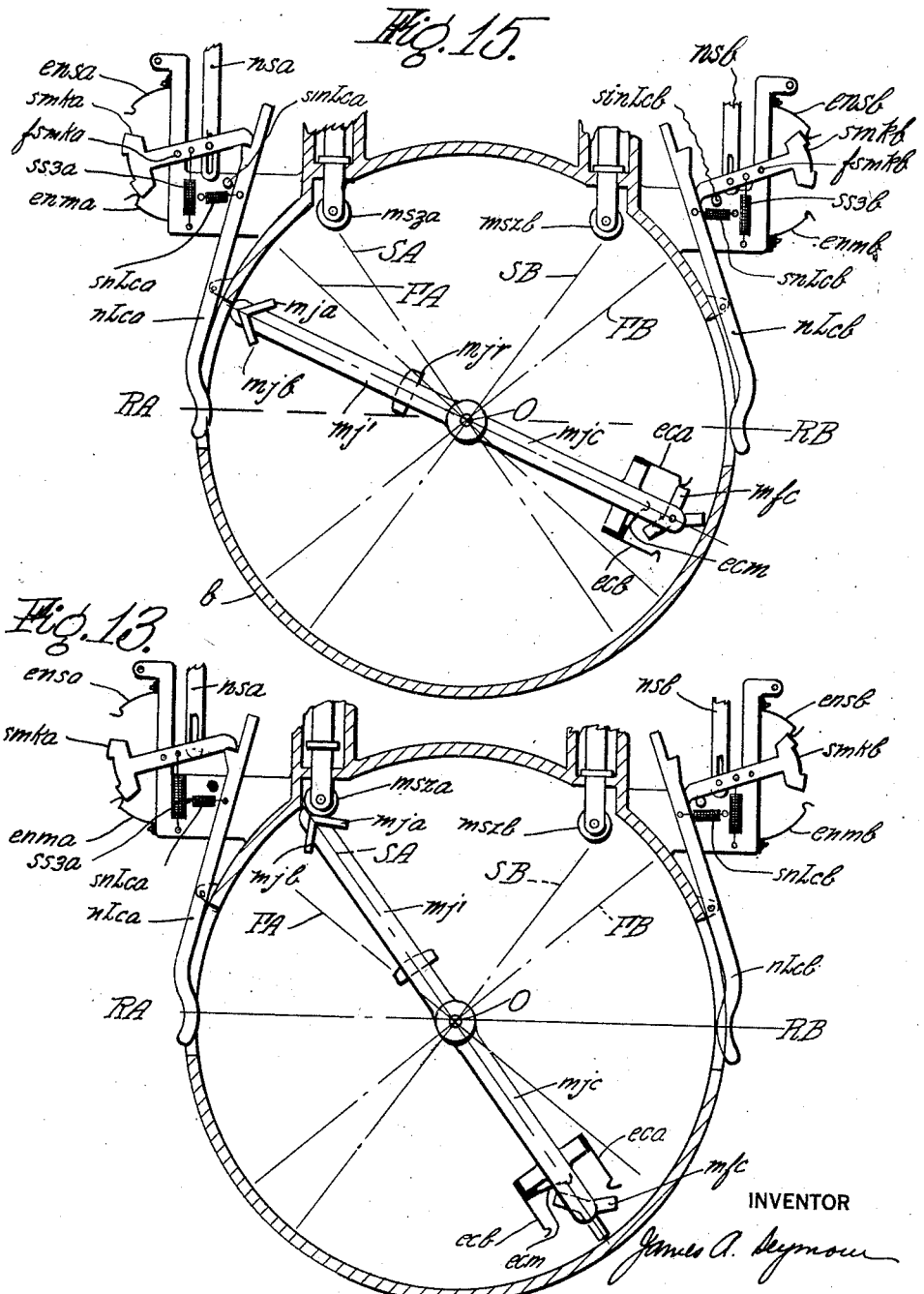

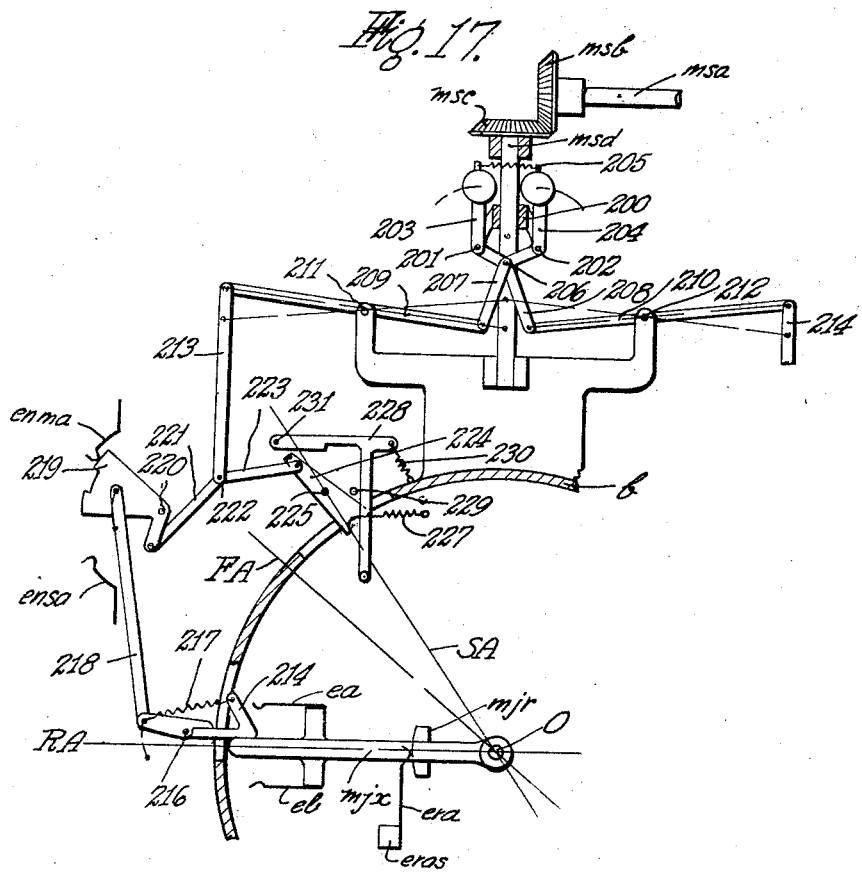
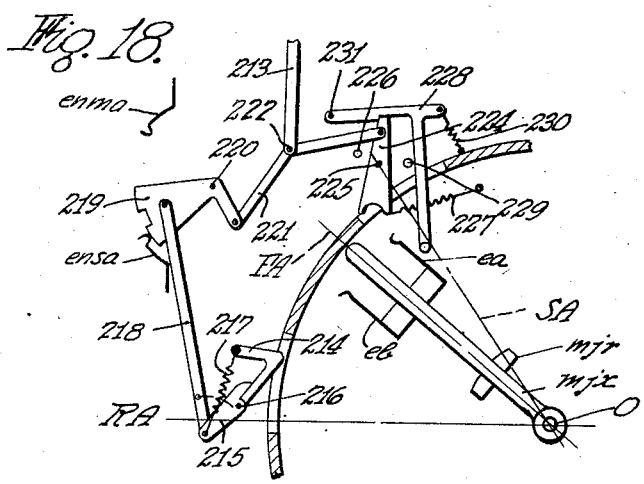

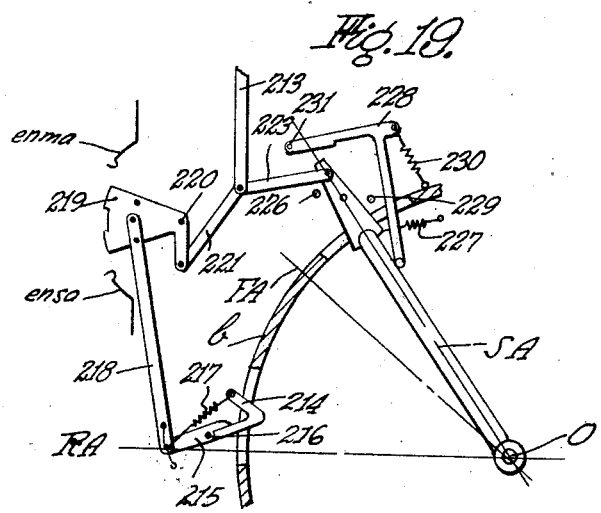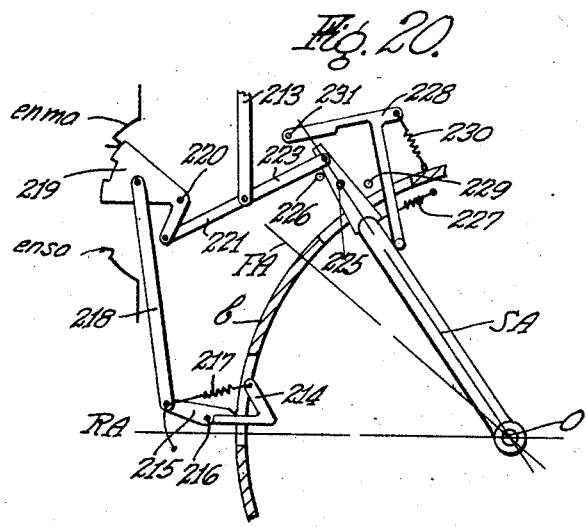

May 26, 1925. 1,539,060
J. A. SEYMOUR
MANEUVERING MECHANISM FOR INTERNAL COMBUSTION ENGINES
Filed March 15, 1924 10 Sheets-Sheet 10
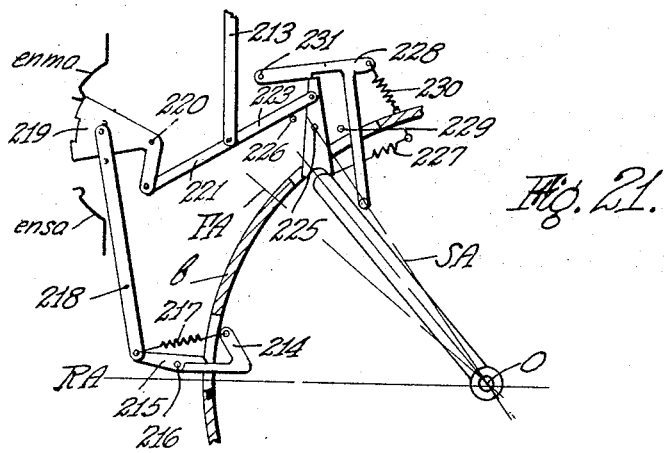
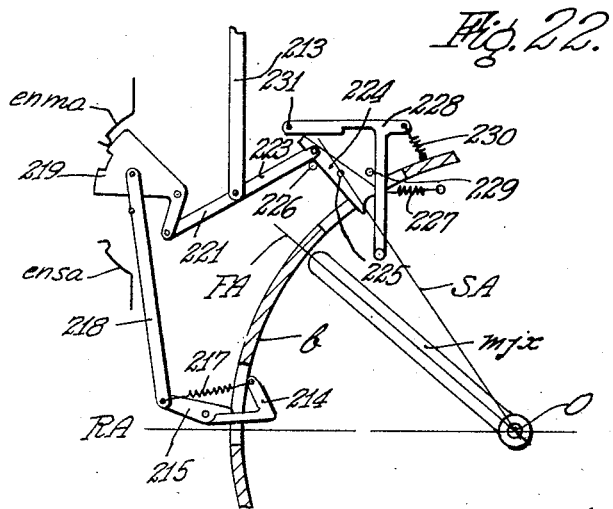
INVENTOR
James A. Seymour
BY Chapin & Neal
ATTORNEYS Patented May 26, 1925.

1,539,060

UNITED STATES PATENT OFFICE.

JAMES A. SEYMOUR, OF AUBURN, NEW YORK.

MANEUVERING MECHANISM FOR INTERNAL-COMBUSTION ENGINES.

Application filed March 15, 1924. Serial No. 699,587.

*To all whom it may concern:*

Be it known that I, JAMES A. SEYMOUR, a citizen of the United States, residing at Auburn, in the county of Cayuga and State of New York, have invented new and useful Improvements in Maneuvering Mechanism for Internal-Combustion Engines, of which the following is a specification.

The invention relates to a novel and improved combination of mechanisms effecting the control or maneuvering of internal combustion reversing engines such as are used for ship propulsion among other purposes. The maneuvers include necessarily starting, stopping, phase reversing and control of speed which latter is effected by changing the effective torque of engine, by varying the amount of fuel fed to engine.

In this particular class of engines to which my invention is especially applicable, each of the various maneuvers are effected by a sequence of more or less independent operations with individual mechanisms so handled that while each operation is being performed none of the other operations of the necessary sequences shall take place which might interfere with the success of the maneuver and one of the main objects of the invention is to so control all of the various sequences of the various operations for the various maneuvers, which may be desired, that the manual control thereof may be as safe and simple as possible and preferably by a single maneuver actuating member.

Other operations in addition to those mentioned above should be controlled by this maneuver actuating member on certain engines, especially those of large size, which may be unnecessary or undesirable on other engines. This maneuver actuating member may constitute a manually operated hand control lever in the case of small engines where not too much power is required; otherwise the maneuver actuating member should be driven by a prime mover or some source of power, the motion of which is controlled by the hand control lever by some form of follow up device such as is used with steam and electric steering devices for ships or other well known mechanism, provided the effect accomplished is to cause a pointer moving with the maneuver actuating member to follow up and eventually occupy the same relative positions as the hand control lever and to remain stationary in this position until a further movement of hand control lever takes place.

While the effect is the same for manual and power drive just described since the operator with power drive need use only a very slight effort to move hand control lever, regardless of size of engine or power required to move maneuver actuating member, which becomes too great for manual effort with reasonable speed of maneuvering for engines of larger sizes, the power drive is also illustrated because some additional advantages flow from the invention when power drive is used.

For instance, while manual operation by a single lever controlling all maneuvers possesses the advantages of less liability of a wrong move by the operator, also of no chance of starting one of the operations out of proper sequence or before the preceding one is finished in which case interference and a breakage of mechanism will take place unless a somewhat elaborate system of interlocking safety devices are used yet on the other hand, where the various operations are controlled by a plurality of individual manually operated levers each handling one or more operations, this latter plan, which is the one in common use and not novel, does give some offsetting advantage in the simplicity of mechanism and cheaper construction (at least where no interlocking safety devices are used) but is by no means as safe or convenient. When one or more of the operations require more power than is practicable with manual operation so that each individual lever requires a separate source of power and for some maneuvers a follow-up device in addition, the advantage of simplicity of mechanism is with a single power driven control as already described, and all the advantages of the manually operated single control lever remain in many respects with increased value.

In the application of my invention which will be illustrated later, the range of movement of the actuating member is thus divided into sections, corresponding to the periods of operation of various individual maneuvering mechanisms, as follows:

1. Three contiguous sections which may be termed the phase "reversing" sections or group of sections, which group may be broadly regarded as a phase reversing section.

2. The series of positions or stations corresponding to graduated amounts of fuel feed occupy a section which may be termed the "ahead running section" for ahead motion, and a similar "astern running section" for a corresponding astern motion.

3. The actuating member also has two starting sections, each section having a corresponding starting station within its range and being adjacent to the corresponding running section, for ahead and astern starting.

Before describing in detail the application of the invention illustrated it may be better to describe in general terms one of its principal features; namely, the use of a number of wrist plate motions in series in the connecting trains of mechanism so that the motion of the actuating member at the source of power, which normally is substantially of even velocity throughout its maximum amplitude, may be by various trains of simple working levers and connecting links, distorted and transformed so that a pause or dwell without substantial motion may be effected for a period of time, during said maximum amplitude of motion, at the delivery end of said train of levers and connecting links at which point, outside of the said period of pause, the even motion of the driving mechanism will be transmitted more or less unchanged.

The use in a valve gear of such a series of wrist plate motions in series as a means of securing an intermittent motion for the valves of a steam engine is described in Letters Patent #1,111,327, issued to me on September 22, 1914.

To explain further, the oldest known example of a simple "wrist plate motion" is represented by part of the drive of an exhaust valve of a Corliss engine, that is, by the wrist plate, the exhaust arm and the link connected to each by suitable pins, one on the wrist plate and one on the exhaust arm. The wrist plate is oscillated through a convenient angle by a connection to an eccentric on the engine shaft. The pin on the wrist plate is usually so placed that at the extreme of angular movement of wrist plate when the exhaust valve is closed, the longitudinal axis of connecting link, if extended, will pass through the axis of rotation of wrist plate, that is, in a plane perpendicular to the last named axis, a projection of this axis, the centre of this connecting pin, and the axis of connecting link will all lie in the same straight line. The effect of this is to cause a diminution in the motion of the exhaust valve, rigidly attached to and revolving with exhaust arm, when closed and subject to pressure of the steam in cylinder and thus to greatly reduce friction and wear. Any pair of rocking levers with a connecting link so disposed may be termed a wrist plate motion, and are so designated in my Letters Patent No. 1,111,327, above referred to.

In the case of a Corliss engine, the extreme of wrist plate or driving lever angular movement, when exhaust valve is closed, usually takes place as described above. In other applications where a still greater diminution of motion is desired, at this end of travel, the extreme of angular movement is made on the other side of the "straight line position" as described above, from the principal amount of movement. The movement of the driving lever for some distance on each side of this "straight line position" gives no appreciable motion to driven lever. Nearly one-half of the angular movement of the driving lever may be substantially blotted out in movement of the driven lever, with movement during the other half transmitted almost unchanged, by having one-half of that part of movement of driving lever, which it is desired to suppress, occur on each side of the "straight line position".

The driven lever of any wrist plate motion may be used as the driving lever for a succeeding wrist plate motion in series by properly disposing the driven lever of the second wrist plate motion, or if the position of driven lever of second motion is more or less fixed, a second driving lever may be attached so as to oscillate with the driven lever of the first motion, properly disposed with reference to the second driven lever. In this way any length of pause at either or both ends of movement may be secured by thus using a sufficient number of wrist plate motions.

If the arrangement of the driven lever, instead of being symmetrical, is such that a greater part of its motion is on the side of its position, when at right angles to the connecting link, nearer to the driving lever, some additional distortion may ensue, but of limited amount unless carried to an extent that introduces undesirable friction and stresses. By using a greater amplitude of oscillation on the actuating member than is customary with a wrist plate motion, further though, in some ways similar effects, may be secured, and as will be illustrated later, by a proper disposition of levers and links and the use of a plurality of series of wrist plate effects, as many periods of no motion as desired, at various points of travel of driving mechanism as desired, and for the length of period desired, may be obtained.

Referring to the drawings:

Fig. I is a view in section through one cylinder and crank case of a Diesel six cylinder engine of the usual type, omitting details not necessary for the understanding of the present invention, and showing in end elevation the maneuvering shaft and trains of mechanism therefrom for effecting the maneuvers of starting and control of fuel feed to said engine. Also in this view appears in section the fuel feed pump for said engine;

Fig. I<sup>a</sup> is a detail projection at right angles to Fig. I of the links 141 and 43;

Fig. II is a similar view of said engine and cylinder in end elevation, with a partial section through the cylinder head in a plane parallel to and at one side of the section in Fig. I to illustrate typical valve mechanism for an exhaust or inlet valve. In this view also appears the maneuvering shaft in a different position than shown in Fig. I and having connected thereto a different train of mechanism for manipulating the valve cam rollers in effecting the reversal of said engine as will be later described. It will be understood that the train of mechanism here shown lies directly behind and parallel to that shown in Fig. I.

Fig. III is another end view of the same cylinder showing still another train of mechanism connected to said maneuvering shaft, which lies behind the train of Fig. II. The maneuvering shaft here shown is in still another position and the train of mechanism is for shifting the cam shaft endwise as will be later described, for effecting the reversal of said engine;

Fig. IV is a detail view partly in center section of the same cylinder head for showing the fuel inlet valve and mechanism for controlling same;

Fig. V is a detail view of certain parts in Fig. III and Fig. IV, and projected in a plane at right angles to the latter, showing further mechanism connected therewith;

Fig. VI is a detail in end elevation of a portion of the engine frame showing in face view a hand controller for power control by follow-up mechanism.

Fig. VII is a detail view of parts directly behind that of Fig. VI showing the power drive for said follow-up mechanism.

Figs. VIII and IX are details in different positions of a switching plate for the follow-up control mechanism;

Fig. X is an enlarged detail partly in section of a modified form of follow-up control mechanism embodying certain automatic features hereinafter described;

Fig. XI is a horizontal section through the controller casing of the control mechanism shown in Fig. X.

Fig. XII is a detail section similar to Fig. X showing relative position of parts not appearing in said latter figure;

Figs. XIII and XV are views similar to Fig. X with the parts in a different position;

Figs. XIV and XVI are details showing positions of other parts corresponding to the positions shown in Figs. XIII and XV; and Figs. XVII to XXII are detail views illustrating a further modified form of follow-up control mechanism operating to perform the same functions as the mechanism of Fig. X to XVI, but in a different manner.

While the drawings illustrate an arrangement not the most desirable for practical construction and use, or for proportions and size of parts, the disclosure adopted enables the functions of the various parts to be much more easily described and understood. The center lines (broken and dotted) indicating different positions of the actuating member corresponding to different stations of maneuvering hand lever are designated by capital letters.

In the type of engine illustrated, the various maneuvers are accomplished as follows:

First; the engine is stopped by shutting off the supply of fuel.

Second; it is started by throwing into gear the starting valves as well as fuel pump, and fuel, air inlet, and exhaust valves, if the latter are not already in gear, the starting valves only being thrown out as soon as engine has started sufficiently to insure running.

Third; it is reversed by stopping engine as above if running, and then swinging reach rods so that the cam rollers are removed from the set of actuating cams in use for all of the valves except starting cam rollers already out of gear, then moving the camshaft lengthwise so as to bring a second set of cams, phased to give a reversed motion to engine, in line with reach rods and finally swinging back reach rods so as to cause all the cam rollers except starting cam rollers to engage their respective cams, the engine being started if desired as described above.

In Fig. I, the principal parts are indicated as follows: *a* is the base frame and part of the maneuvering gear casing; *b*, the crank case also integral with parts of the maneuvering gear casing; *c*, the engine cylinder; *d*, the cylinder head; *e*, the piston; *f*, the piston rod; *g*, the crosshead; *h*, the connecting rod; and *j*, the main crank shaft of the engine.

The starting valve 1 is situated in the starting valve cage 2, part of which forms the seat for the valve. Compressed air of suitable pressure for starting the engine is supplied from a suitable reservoir, not shown, through a supply pipe 3 and a starting air shut-off valve 4. The means of compressing and delivering this compressed air to the engine may be either driven by the engine or independently driven and are not shown. This is also true of the high pressure air supplied to the fuel valve cage 5 as described later.

The starting valve 1 is seated by spring 6 and opened by a train of mechanism consisting of a stem 7, lever 8 pivoted at 9 and connected to the reach rod 10 which carries the cam roller 11, driven by the starting cams 12$^a$ and 12$^b$ mounted upon camshaft 13 journaled in cam bracket 14. The nose of starting cam 12$^b$ for astern motion is situated behind that for forward motion at 12$^a$.

The starting cam roller 11 can be disengaged entirely from its cam 12$^a$ by swinging the reach rod 10 so that the lower connected end thereof will occupy position "R$^7$" instead of "S$^7$" as shown. This is accomplished by turning the starting lay shaft 15 so as to move the rocker arm 16 which is rigidly mounted on starting lay shaft 15 and is connected to reach rod 10 through link 18 to bring its lower end from position "S$^6$" to "R$^6$". The mechanism for thus moving the starting lay shaft 15 will be described later.

The air starting shut off valve body 20 is provided with a spring closed valve 4 closed by spring 21 and opened by moving a slotted link 22 to position shown which acts on the shut off valve 4 through rocker 23, pivoted at 24 and link 25. The slot in link 22 is so situated that the shut off valve 4 is opened only when the operating end of link 22 approaches very near to the position shown at "S$^8$" and the shut off valve is unaffected at other points in travel of link 22 from positions between "S$^8$", "F$^8$" and "R$^8$" because at such times the pin slides freely in the slot. The means used for moving link 22 will be described later.

The fuel valve cage 5 contains the fuel valve and atomizer (shown more in detail in Fig. IV) and is supplied with fuel oil through deliver pipe 26 by fuel pump 27 mounted on an extension of maneuvering case "b". The fuel pump is provided with delivery valve 28, suction valve 29, supply pipe 30 from suitable fuel oil reservoir, not shown. The fuel pump plunger 31 is driven through the pin 32 by the eccentric strap 33 surrounding the eccentric 34. The eccentric is mounted upon an inclined cylindrical boss 35 forming as an integral part of the center shaft 36 with a spline 37 so that the eccentric 34 must turn with center shaft whereas the center shaft 36 can be moved longitudinally with reference to the eccentric 34 while the latter is prevented from so moving by wings 38, guided by ends of two of the three bearings 39$^a$, 39$^b$, and 39$^c$, in which the center shaft 36 is journaled. In a similar way, the driving gear wheel 40 (which is driven by a suitable train of gears, not shown, from the main engine crank shaft "j") is mounted upon the center shaft 36 by a spline 41 so that the shaft is free to move longitudinally while gear 40 is not allowed any longitudinal movement by two of the eccentric shaft bearings 39$^b$, and 39$^c$, adjacent to said gear, while at the same time by reason of said spline 41 the center shaft 36 must turn with driving gear 40. The center shaft 36 has a ball and socket connection 42 with link 43 so that shaft 36 is free to turn with reference to link 43 but has its longitudinal position controlled by said link which is moved longitudinally by a mechanism to be described later. It will be noted that when the center shaft is in the longitudinal position shown corresponding to position of ball and socket connection 42 which is marked "S$'^4$" and "F$'^4$" that the axis of the eccentric 34 upon the inclined cylindrical boss does not coincide with axis of said center shaft in its journals in bearings 39$^a$, 39$^b$ and 39$^c$, so that when the shaft revolves the eccentric 34, driving the plunger 31 through eccentric strap 33 gives the plunger a stroke of twice the mean eccentricity of the axis of said eccentric 34 with reference to axis of shaft 36 in its bearings. On the other hand, when ball and socket connection 42 is moved by the link to position "R$'^4$", the mean position of the axis of the eccentric 34 will coincide with that of the axis of shaft 36 upon which it turns. Consequently the eccentric strap will ride concentrically with the shaft 36 and the plunger 31 of the fuel pump will remain stationary, and the delivery of fuel oil to the engine will stop.

It will be further noted that for intermediate positions of ball and socket connection 42 between "S$'^4$" or "F$'^4$" giving maximum stroke and delivery to fuel pump and position "R$'^4$" giving no fuel pump stroke and no delivery of fuel oil to the engine, any stroke and delivery of fuel by pump desired between zero and maximum can be obtained.

The maneuvering of engine is controlled by the hand lever H. In Fig. I, the power drive and the follow-up device by which the main maneuvering crank shaft "O" is made to follow any movement of hand lever H is not shown, and this will be described and illustrated later. For the present the hand lever H may be considered keyed rigidly to the maneuvering crank shaft "O" as actually takes place when invention is applied to small engines where the power required to maneuver is within the limit of manual effort. In Fig. I, the hand lever H is shown in opposite phase to a crank 44 and pin 45 of the maneuvering crank shaft "O".

The various stations for hand lever H are represented by the points SA, FA, RA, EA, EB, RB, FB and SB: SA to FA ahead starting section, FA to RA ahead running section, RA to EA "rock" section, EA to EB endwise shift section, EB to RB "rock" section, RB to FB astern running section, FB to SB astern starting section. Of these, the two "rock" and "endwise shift" sections comprise the "reversing" group of three sections, or broadly the reversing section.

Starting from RA stop station; for ahead motion if the hand lever H is moved to station SA, as shown in Fig. I, it will cause full fuel to be supplied to the cylinder and will put the starting valve 1 into operation and open shut off valve 4. When this has caused the engine to start, the hand lever H should be moved back to station FA if full power ahead is desired. This operation cuts out the shut off and starting valves. If it is desired to run engine at less than full power, the hand lever H is moved more or less towards the stop station for ahead motion RA, giving a corresponding reduction in the fuel supplied and consequently in the power and speed of engine.

If on the other hand starting from the stop station RA, the hand lever H and maneuvering crank shaft O are moved in the opposite direction, the main lay shaft will be turned or rocked, so that cam rollers for fuel, air inlet and exhaust valves will be disengaged by the time the hand lever H reaches station EA. Continuing the motion from EA to station EB will cause the main cam shaft 13 (driven by a train of gears, not shown, from main crank shaft at one half engine speed since engine shown is of four stroke cycle type) to move endwise sufficiently to bring all the cams on this shaft, for astern motion of engine, opposite their respective rollers. Still continuing, the motion to RB station will "rock" back the main lay shaft 74 causing their respective cam rollers to engage all the astern motion cams on shaft 13 except the starting cam rollers. Moving the hand lever H from station RB still further to stations FB and SB and back to FB will have same effect as described above for moving from RA to SA, and back to FA except that the motion of main crank shaft $j$ will be in the reverse direction. Similarly motion of the hand lever H from station RB through EB and EA to RA will cause cam rollers to engage ahead running cams instead of astern running cams.

The details of mechanism for the rocking of main lay shaft 74 and endwise shifting of main cam shaft 13 will be described later.

In Fig. I the details of mechanism for controlling the supply of fuel to engine and the starting of engine only are shown.

By a succession of wrist plate effects (such as have already been described in a general way) the starting cam rollers are rocked into engagement with their respective cams and the opening of starting air valve after such engagement, is made to take place while the hand lever is moving from FA to SA or from FB to SB, and reversely when the hand lever is moved from SA to FA or from SB to FB, the starting air shut off valve 4 is first closed and the starting off cam rollers rocked out of engagement, closing the starting valves. During travel of hand lever H from FA through RA, EA, EB, RB, to FB or the reverse of this travel, the starting cam rollers are kept disengaged and the starting air shut off valve is kept closed.

Starting with the crank pin 45 on maneuvering crank shaft O, the train of mechanism is as follows: Link 46 drives rocker arm 47 pivoted at fulcrum 48. It will be noted that for both stations SA and SB of handle H the corresponding position of the link end of rocker arm 47 is the same, namely, at $S^1$, for stations FA and FB it is at $F^1$, and for RA and RB it is at $R^1$, and the extreme position is at $M^1$. Rocker arm 47 drives through link 48, the rocker arm 49 pivoted at fulcrum 50 and the positions of the link end of arm 49 corresponding to the hand lever stations are at $S^2$, $F^2$ and $R^2$ respectively, with extreme position at $M^2$.

Following through the train of mechanism we have link 51, driving rocker 52 pivoted at fulcrum 53 having its link end positions, $S^3$, $F^3$ and $R^3$ corresponding to the hand lever stations having same first letter and its extreme of travel at $M^3$. Thence link 54 drives rocker 55 pivoted at fulcrum 56 and having corresponding positions for its link end at $S^4$, $F^4$, and $R^4$ and extreme position at $M^4$. Thence link 57 drives rocker 58 keyed rigidly to starting lay shaft 15 and having positions for one end thereof at $S^5$, $F^5$, and $R^5$, which is also position of extreme travel, all corresponding to hand lever stations having same first letter. Keyed rigidly to this same starting lay shaft 15 are rocker 16 connected to cam roller 11 as already described and rocker 59 operating the slotted link 22 connected to shut off valve 4 as already described.

It will be noted that while the distance between SA and FA or SB and FB stations is very small compared to entire motion of hand lever H, for the corresponding stations of the rocker 58 on the starting lay shaft 15, the distance between $S^5$ and $F^5$ comprises almost the entire motion, the remainder between $F^5$ to $R^5$ being too small to present any difficulty.

It will be noted that the same train of mechanism as that used for the starting operation just described is used for the fuel pump control as far as rocker 52 which has a short arm 60 having corresponding to the hand lever stations, link end positions $S'^3$, $F'^3$, and $R'^3$ with a small negligible overtravel beyond $R'^3$ to $M^3$. In the motion transmitted thence through link 43 to ball and socket connection 42, the wrist plate effect has been placed at other end of travel from those preceding in the same train so that stations S'⁴ and F'⁴ are brought to same point and the distance between R'⁴ and F'⁴ comprises substantially the entire endwise travel of fuel pump shaft 36, and consequent control of amount of fuel delivered to engine as already described. Moving the hand lever from FA or FB to SA or SB stations respectively therefore does not affect the fuel pump delivery which is changed from full load to zero gradually by moving hand lever from FA or FB to RA or RB stations respectively.

In Fig. II is shown train of mechanism controlling the operation of rocking the main lay shaft 15, as already described in general terms.

It will be noted that a separate crank 61 is provided on the maneuvering crank shaft O and located opposite to the crank 44 (in Fig. I) on the same crank shaft but in same phase with hand lever H which in this view is shown at station RA.

Following the train of mechanism beginning with the crank pin 62, the motion is transmitted through link 63 to rocker 64 pivoted at fulcrum 65, and the rocker has link end positions corresponding to the hand lever stations, of same first letter at SS¹, RR¹, and E¹, the latter substantially at the extreme of travel. Then link 66 drives rocker 67, pivoted at fulcrum 68, said rocker having link end positions of corresponding stations, at SS², RR² and E², then through link 69 to rocker 70, pivoted at fulcrum 71 said rocker having link end positions of corresponding stations, at E³ and RR³, with only a slight over travel outside of each, thence through link 72 to rocker arm 73, keyed rigidly to main lay shaft 74, said rocker arm 73 having positions for corresponding stations at E⁴ nearly at one extreme of travel and RR⁴ exactly at other extreme. Keyed to lay shaft 74 is the shorter rocker arm 75 connected through link 76 to reach rod 77. With hand lever at station RA and rocker arm 73 in position RR⁴, as shown, the cam 78ᵃ on cam shaft 13 will engage cam roller 79 and through link 77, rocker 80 pivoted at fulcrum 81 and stem 82 open at proper time the valve 83, which is spring closed by spring 84.

The cylinder head is drawn with an offset section which will make 83 represent equally well an exhaust or air inlet valve according as the offset section shown is behind or in front of center line of the cylinder. Similarly 85 will represent either exhaust or air inlet cage and seat and 86 either air inlet or exhaust pipe.

It will be noted that in this train of mechanism the travel of hand lever from EB to EA is almost entirely suppressed by the effect of the crank 61 and link 63 and that three wrist plate effects in series are used to suppress all motion of main lay shaft 74 during travel of hand lever between SA and RA and between SB and RB since between all these latter stations all the running positions of engine occur during which the cam rollers must be held in proper position on the cams.

In Fig. III is shown train of mechanism controlling the operation of endwise shifting of cam shaft 13 as already described in general terms. It will be noted that in this view the handle H is shown at station EA and that a crank pin 87 is provided on the underside of the same crank 61 as shown in Fig. II.

From the crank pin 87 link 88 drives rocker 89 pivoted at fulcrum 90, which through link 91 drives rocker 92 pivoted at fulcrum 93, thence link 94 to rocker 95 pivoted at fulcrum 96, thence link 97 to rocker 98, pivoted at fulcrum 99, from which link 100 drives through the universal joint 136 the rocker arm 101, the end only of which is shown in Fig. III. Fig. V, a projection at right angles to Fig. III, shows rocker arm 101 fixed to shaft 102 mounted in a bearing 103 (see Fig. III) and having fixed thereto a forked arm 104 for engaging through trunnion pins a collar 105 rotatable upon cam shaft 13 but held from endwise movement on said shaft by flanges 106. In this manner the cam shaft 13 may be moved endwise (the driving gear for said cam shaft not shown being provided with sufficient length of gear face to permit such movement) by shift of trunnion pins from station EA⁵ to EB⁵ when the hand lever H is moved from station EA to EB or vice versa, and no endwise motion whatever of the cam shaft 13 will take place when the hand lever is moved from stations EA to SA and from EB to SB and vice versa.

This will be apparent from considering the several positions of the connecting links and rockers from handle H, the positions of said rockers being indicated to correspond with the station positions EA and EB of handle H.

It will be noted that the position of link 88 is nearly at right angles to that of link 63 in Fig. II, in order to suppress in motion of rocker 89 as much as possible the motion of the handle H from stations EA to SA and from EB to SB. It will be noted that the over travel of rocker 89 beyond position EA¹ is greater than beyond EB¹. The motion of the rocker 92 has the over travel beyond EA² reduced to much less than beyond EB². The motion of rocker 95 has the over travel beyond EB³ less than beyond EA³. In the motion of rocker 98 the over travel beyond EA⁴ is still further reduced to a negligible amount, and the over travel beyond EB is practically suppressed. Referring to Fig. V, the motion of rocker 101 has the over travel beyond EB⁵ entirely suppressed as well as that beyond EA⁵.

It will be noted that the intermittent motions achieved in the various operations above described could be accomplished by a driving element having a forward and return motion, either circular or of translation, and equipped with a number of actuating cams of suitable form for various operations. The construction shown is preferable, however, since it can be operated more smoothly and quickly, and with much less power due to less friction involved; also while it involves a greater number of parts they are much more easily and cheaply made and kept accurate. By using most of the fulcrum pins in common, and placing the various trains of mechanism side by side upon them, and using a large number of duplicate links, pins, etc., as can be arranged in actual construction, a very compact arrangement, easily and cheaply fabricated is secured.

Fig. IV and Fig. V show a device for changing the period of opening of fuel valve 107 measured in terms of degrees of rotation of main crank shaft $j$ (Fig. I). Fig. V is a projection in a vertical plane at right angles to that of Fig. IV, and shows some parts that are in the latter for increased clearness. The parts in Fig. V are mounted on extensions of the front of engine frame $b$ which extensions are not shown in order to increase clearness of parts shown. It will be noted that the upper part only of link 108 appears in Fig. IV, and since the inclination of this link is at right angles to plane of projection of Fig. IV, it is apparent in Fig. V only. For this reason the upper end of this link engages a ball and socket pin 109. It will be noted that the rocker 110 upon an arm of which this pin is mounted, has its arm slotted and the pin is provided with a shoulder on one side of slotted arm and a thread and a threaded hand wheel 111 on the other. This enables the position of pin to be adjusted radially on the arm which has the effect of varying the amplitude of the arc through which rocker 110 swings symmetrically with reference to its central position.

The oil fuel is supplied through pipe 26 and is sprayed into cylinder by air, supplied through pipe 112 of a considerably higher pressure than that in the cylinder. The amount of oil fuel which can be properly sprayed and the consumption of high pressure injection air depends on the area of the fuel valve opening and the period of time during which it is open. If an engine runs at a speed much below normal full speed the period of time that fuel valve remains open increases and the amount of oil required per stroke is usually lessened so that obviously it would give greater economy in consumption of high pressure air, together with some other advantages, such as ability to run slower, if the time period and amount of opening of fuel valve were reduced from that necessary for full power and speed.

The ahead and astern fuel cams 113ª and 113ᵇ are shown in proper position for a piston on head end center of working stroke (see $e$ Fig. I). By making the entering working faces of both cams conform to a circumference of a circle having its center coincide with pin 114 at upper end of fuel valve reach rod 115 then by swinging the reach rod and its cam roller out of neutral position toward the nose of cam that it is engaging, the time of opening of fuel valve will remain about at beginning of stroke of piston as is desirable in this type of engine but the amount of opening and its duration for a given speed of engine will be obviously reduced as is desirable for reasons given above. The valve 107 is operated through cam roller 116 carried on pivot 117 of reach rod 115, pin 114, rocker 118, fulcrumed at 119, and rocker 120, fulcrumed at 121. The position of cam roller 117 is adjustable relative to the cams 113ª and 113ᵇ by means of link 122 connected to the rocker 110 and the different positions assumed by the upper end of said rocker 110 are from the center position CIA2 identical with CIB2, to either CXA2 or to CXB2. It will be observed that the locus of the different positions for the cam roller pivot 117 during these adjustments is dotted line LX substantially concentric with the entering surfaces of cams 113ª and 113ᵇ. When the parts are in neutral position as shown, valve 107 will have normal fuel opening when rocker 110 is at station CIA2 but will give reduced duration and amount of opening if rocker 110 is at station CXA2. However, if engine is running in a reverse direction, the rocker 110 must be moved from neutral position CIB2 in a reverse direction to station CXB2 to reduce duration and amount of valve opening. Therefore rocker 110 must be moved from neutral position shown, and which gives full valve opening, to reduce duration and amount of valve opening and the movement must be in opposite directions for ahead and astern rotation of engine. It will be noted that 110 is a floating bell crank rocker pivoted on the main rocker 124 rigidly fixed upon main lay shaft 74 so that when the latter is rocked to permit endwise shift of main cam shaft 13, all of the mechanism for changing valve opening as well as fuel valve roller cam will be shifted out of the way.

The adjusting lever $hc$ is fulcrumed at 150 and for full fuel valve opening is held in station CI, by suitable latch (not shown) and may also be similarly held at CX or at various intermediate stations. The axis of lever *hc* when in the position CI, as shown, if extended would pass through center of pin 109 to which it is connected by fulcrum pin 125 floating link 126, pin 127 and floating link 108. Pin 127 is also connected to some part of the reversing mechanism that always assumes one definite position when engine is running with ahead rotation and some other definite position for astern rotation. As shown, this connection consists of link 128, pin 129 on rocker 130, pivoted at fulcrum pin 131, and provided with a segment of a gear for engaging a gear segment on rocker 132 pivoted at fulcrum 133, the latter being connected by link 134 to pin 135, mounted on rocker 101, already described. These connections are such that when engine has ahead rotation pin 127 will occupy station CIA1 and the upper end of rocker 110 will be at CIA2, shown since trunnion collar 105 occupies station EA⁵ and when engine has astern rotation, and collar 105 occupies station EB⁵, pin 127 will occupy station CIB1 and rocker 110 the station CIB2, the correct position for astern rotation, full fuel valve opening, and which it will be noted is same position as station CIA2, when lever *hc* is at station CI. If however, lever *hc* is fixed at station CX when collar 105 is in station EA⁵ (ahead rotation) pin 127 will occupy station CXA1 and rocker 110 will occupy station CXA2 correct for ahead running and minimum duration and amount of fuel valve opening. When lever *hc* is at station CX, and collar 105 is at station EB⁵, pin 127 will be at station CXB1 and rocker 110 will be at station CXB2, correct position for minimum fuel valve openings astern rotation, but different for minimum position for ahead running. If adjusting lever *hc* is placed at intermediate stations between CI and CX obviously intermediate fuel valve openings will be obtained. If the conditions are such that the relation between the speed of engine and the torque developed by engine vary a good deal from time to time, a hand adjustment of lever *hc* is advisable, but if in general when speed falls off, the torque runs down and vice versa, an arrangement is advisable to automatically change fuel valve openings with change of engine torque which of course varies with stroke of fuel pump. Therefore, the desired change can be accomplished by connecting lever *hc* with fuel pump control mechanisms. This connection may consist of a pin 137 on the lever *hc* for detachable engagement with a hooked link 138 pivoted on bell crank rocker 139, rigidly fixed on a cross over shaft 140, and having an arm connected to a link 141. The link 141 is connected to a pin 142 on the link 43, as shown in Fig. I and Fig. Iᵃ. The upper part of link 141 appears only in Fig. Iᵃ, while lower part of link 141 appears only in Fig. V. The pivotal connections 142 and 143 at the upper and lower ends of link 141 are both ball and socket joints since they are connections to rockers swinging in different planes.

While the speed and torque may always vary together, the rate of change may not be the same for both. In this event the pin 109 can be adjusted by hand as already described so as to reduce the amplitude, on either side of the normal full load position, as the case may be, of movement of rocker 110 and consequently pivot 117 for a given movement of lever *hc* from station CI and thus compensate for difference in rates of changes mentioned.

Fig. VI and Fig. VII show details of a power drive with suitable follow-up mechanism which may be employed in place of having handle H connected directly to the maneuvering crank shaft O. The hand lever *mh* is here shown attached to the rim of a wheel *hr* turning loosely upon the maneuvering drive shaft O. The various stations are in the same angular positions as shown with manually operated lever H in Fig. I, and hand lever *mh* may be provided with a latch (not shown) which will engage various notches for various running positions between stations FA and RA and between FB and RB with a stop to prevent over-running starting positions SA and SB, all of which is actually provided with manual lever H in Fig. I, but omitted in drawing for the sake of clearness. Upon the inner circumference of rim *hr* is fastened a single tooth *th* of an ordinary internal spur gear. This engages the corresponding recess in the switching plate *mk* profiled to the ordinary shape of recess between adjoining teeth of an external spur gear. The plate *mk* is pivoted upon fulcrum pin *mg* which is carried by an arm *mj* attached rigidly to maneuvering shaft O. The position which plate *mk* assumes after tooth *th* has passed it in a clockwise or in a counter-clockwise direction is shown in Fig. VIII and Fig. IX respectively. It will be noted that form of plate is such that it is locked in either position against casual turning by suitable guide faces abutting the rim *hr*.

In Fig. VII *mf* is a master switch fastened to plate *mk* so as to turn with it on fulcrum pin *mg*. When plate *mk* is in position shown in Fig. VIII a contact segment of master switch *mf* will engage insulated contact spring *ea* mounted on arm *mj* and when plate *mk* is in position shown in Fig. IX, a segment of *mf* will engage insulated contact spring *eb*. In order to secure proper motor control with the equivalent of a two pole double throw switch, two insulated contact segments like *mf* each with two contact surfaces, and two pairs of contact springs like *ea* and *eb* may be provided.

Electrical connections (not shown) between master switch *mf*, contact spring *ea*, contact spring *eb*, electric motor *m*, and some source of electric power (not shown) are so disposed that if hand lever *mh* and tooth *th* are in neutral engagement with plate *mk*, and are moved in either direction, the resulting closing of electric circuit by master switch *mf* will cause the motor *m* driving through pinion *mc* mounted rigidly upon motor shaft *mb*, to turn gear wheel *md* in a direction following motion of hand lever *mh*, and with it maneuvering crank shaft O to which it is rigidly attached, and together with it arm *mj*, and crank pins 45 in Fig. I, 62 in Fig. II, and 87 in Fig. III. After the hand lever *mh* has been put in the desired position and the plate *mk* has caught up and engaged the tooth *th*, the master switch *mf* will be moved into neutral position, the circuit broken, and the motion of maneuvering crank shaft O will cease. In this way any movement of hand lever *mh* is at once followed by a movement of maneuvering crank shaft identical in direction and amplitude.

While in actual practice, electrical refinements are added such as use of relay currents and contactors, dynamic braking to prevent over-running of motor, etc., they add nothing to the invention outside of summation of their well-known advantage and are not shown.

Full automatic control.

The foregoing does not give a completely automatic control by a single lever and a power driven follow-up mechanism, such as eventually will be highly desirable, and especially when the engine control is directly operated from the bridge for which my invention is particularly suitable. In the foregoing, when the maneuver involves starting of the engine, it is necessary to hold hand lever at starting station until engine has started properly after which it can be moved to station calling for the running condition desired.

The above plan has been described first since it will make easier a clear description of additional necessary devices for full automatic control where hand lever can always be put at once at station calling for running condition desired.

These consist of a mechanism for throwing out the follow-up control when hand lever is moved out from either stop position RA and RB, and also for causing maneuvering crank shaft O to continue motion to corresponding extreme or starting position SA or SB, and stop, and another mechanism consisting of a device for putting the follow-up control in gear, after the engine has made a sufficient number of turns to insure proper starting. Since the crank shaft has over-run the running position of hand lever, the effect of throwing the follow-up control into gear will be to bring the crank shaft back to station corresponding to that of the hand lever, giving the full automatic control with the single lever desired. The devices for the foregoing are illustrated in Figs. X to XVI inclusive—Fig. XI being a horizontal section, the others being vertical sections taken at different points. In these further views, the parts similar to those shown in the foregoing drawings are designated by the same reference characters.

In Fig. X and Fig. XI, is shown an arm *mj'* fixed to the shaft O and having a switch *mf* pivoted at *mg* similarly to that on arm *mj*, shown in Fig. VII. It will be understood that the hand wheel *hr* and handle *mh* are here provided, as shown in Fig. XI, which also shows the latch *mha*, not shown in Fig. VII. The tooth *th* of this hand wheel engages a similar switch plate *mk* fixed to the shaft *mg* on arm *mj'*. Arm *mj'* has an extension *mjc* in opposite phase and provided similarly to *mj'* with a shaft *mgc* upon which is mounted insulated contacts *mfc* and switch plate *mkc* (see Figs. XI and XII), both mounted so as to turn with the shaft *mgc*. It will be noted that the phase of the position of the shaft *mgc* is always opposite that of *mg*. If the arm *mj'* moves from the stop station RA as shown in Figs. X, XI, and XII, toward starting station SA, the plate *mkc* having the guide face *ogm* in contact with the guide surface on casing *b* will be shifted by engaging the tooth *thra* so that the guide face *oga* will come in contact with the guide surface of casing *b* as shown in Fig. XVI. This will shift the contact surfaces of plate *mfc* so that instead of contact springs *ecm* being in contact as shown in Fig. X, *eca* will be in contact as shown in Fig. XV. It should be noted, however, that, since the latch arm of switch *smka*, to be described later, will at this time be disengaged the position of switch *smka* will be as in Fig. X with contacts *ensa* engaged instead of as in Fig. XV. The contacts *ensa* are in series in the same circuit that passes through contacts *eca* which circuit herein termed a secondary control circuit, is independent of the primary follow-up control circuit containing the contacts *ea* and *eb*, and when closed operates the motor to cause arm *mj'* to move in a clockwise direction independently of position of handle *mh*. The circuit passing through *ecm* is in series with the primary control circuit passing through either contact *ea* or *eb* whichever may be engaged with *mg* to operate the motor for causing *mj'* to follow the handle *mh* as was described in connection with Fig. VII. Therefore, breaking this contact *ecm* will disengage the primary follow-up control and the circuit passing through contacts *eca* and contacts *ensa* which will be closed, will cause the arm *mj'* to revolve in a clockwise direction, as already stated. This will continue until the arm *mj'* reaches the starting station SA when the inner guide face *iga* of plate *mkc* will engage a tooth *thsa* upon an inner guide surface *bcga* which will turn the plate *mkc* into the position shown in Fig. XIV with contacts *eca* and *ecm* both disengaged as shown in Fig. XIII. It is obvious that an overrunning in either direction will tend to return the arm *mj'* to station SA because the shifting of the plate *mkc* will close the circuit to produce this effect in a similar manner to the follow-up control previously described. In order to avoid any break in the motion of the arm *mj'* when it leaves station RA and moves towards SA at the time the tooth *thra* engages the plate *mkc*, an insulated contact piece *mjr* attached to the gear wheel *md'* as shown on Figs. X and XI, will engage the contact spring *era* mounted upon a fixed block *eras*. These complete a circuit in multiple with the primary circuit passing through the contact *ecm*. The length of the contact piece *mjr* is limited so that it will cease to function after contact springs *eca* have engaged.

When the arm *mj'* reaches station SA, it will cause engine to start as previously described.

The translating device for restoring the primary follow-up control into operation after engine is started is shown mainly in Fig. X. *msa* is a shaft driven through a suitable train of gears not shown, so that it will revolve at engine speed or in some definite ratio to that speed. This shaft by means of bevel gears *msba* and *msca* drives a shaft *msea* mounted in bearing *msda*, mounted upon maneuvering casing *b*. A similar pair of gears *msbb* and *mscb* drive a similar shaft *mseb*. The latter shaft functions only when starting the engine in astern direction, while the former functions when starting the engine in an ahead direction. At the lower end of shaft *msea* is a jaw clutch. In line with this is a shaft *msga* provided at its upper end with an engaging clutch *msfa*. This shaft *msga* at its lower end is provided with a grooved sleeve *msva* held in place by the removable flange *mswa* fastened to shaft *msga* upon which the sleeve *msva* is free to move longitudinally except that it is normally held against the collar *mswa* by the spring *msua* pressing against the collar *msufa* fastened upon the shaft *msga*. The link *msya* is of square section and mounted in bearings *msyba* in such a manner that it cannot turn but is free to move endwise. This link is forked at its upper end and engages the trunnion pins of trunnion *msxa*. It is also forked at the lower end and provided with a roller *msza*. The arm *mj'* is provided with two inclined wings *mja* and *mjb*, as shown. When the arm *mj'* approaches the position corresponding to station SA, the wing *mja* will engage the roller *msza* lifting the shaft *msga* so that the half clutch *msfa* will engage the half clutch *msea* causing the shaft *msga* to turn with the engine as long as the roller *msza* engages the wing *mja*. The clutch engagement is a yielding one due to action of spring *msua*. There is also a collar *msyfa*, fixed upon shaft *msya* with a spring *msyua* between said collar and the upper bearing *msyba* to insure that when the wing *mja* recedes from the roller *msza* the clutch will disengage.

The shaft *msga* is guided in a sleeve *msia* which in turn is threaded and guided in the nut *msha* fixed to the maneuvering casing *b*. The shaft *msga* is free to move endwise in this threaded sleeve but is prevented from turning by the spline *msja*. The action is such that when the engine turns in a forward direction the sleeve turning in the nut will move downward. At the lower end of this sleeve is provided an annular groove in which is situated free to turn a trunnion block *mska*. A lever *msma* pivoted at *msna* is provided with a forked end which engages the trunnion pins *msLa*. This pivoted lever *msma* is provided at its outer end with a pin *mspa* to which at attached a strong spring *msta* fastened at its other end to the stud *mssa* mounted on the casing *b*. The thread on the sleeve *msia* is made with a sufficiently rapid pitch so that when the clutch *msfa* is disengaged the action of this spring *msta* will cause the sleeve to assume its uppermost position. The lever *msma* is also provided with a pin *msca* connecting to the link *nsa*.

When engine has started, and link *nsa* lifts, it will operate the switch *smka*, pivoted at *fsmka*, to which it is connected by the pin *pnsa*, upon the arm of switch *smka*, engaging the lower end of slot in link *nsa*. This will change these mechanisms from the positions shown in Fig. X to the positions shown in Fig. XIII. It will be noted that by varying the position of the lower end of this slot, the number of revolutions which the engine makes after starting, before link *nsa* engages pin *pnsa*, can be varied as desired, in order to insure a proper starting of engine before operating the switch *smka*. The operation of this switch disengages the contacts *ensa*, which are in series in the secondary control circuit passing through contacts *eca*, and closes the circuit of contacts *enma* which is in multiple with the primary circuit of contacts *ecm*, both of which are in series with the circuit of either contacts *ea* or *eb* on Fig. X. This therefore, will throw the follow-up mechanism into action, and cause the arm *mj'* to return to the running station at which the hand lever is located as was described in connection with Fig. VII.

It will be noted that by reason of the latch arm of switch *smka* engaging with a trip lever *nLca* as shown in Fig. XV, which happens when the slotted link *nsa* has engaged the pin *pnsa*, upon starting of the engine as described above, that the follow up control is thereby held in gear, although when the arm *mj'* leaves the station SA, thereby causing the engaging clutch *msfa* to disengage, and the link *nsa* to assume its normal lower position, the switch *smka* would assume its normal position against the stop *sxnLca*, as shown in Fig. X, were it not for the action of this latch. A spring *snLca* is provided to operate this latch as shown. The follow-up control, therefore, will remain in engagement and cause the arm *mj'* to follow any movements of the hand lever in the running section between RA and FA. When the lever *mj'* is caused to come back to RA it presses against the lower end of *nLca* and releases the latch holding *smka* and the latter returns to position of Fig. X. Should, however, the hand lever be moved outside of this section between RA and FA and pass the station RA, the arm *mj'* in following its motion will cause the plate *mkc* carried on *mjc* which is in the position shown in Fig. XVI to assume the position shown in Fig. XII by reason of the engagement of the plate *mkc* with the tooth *thra*, opening the secondary circuit of contact springs *eca* and closing the primary circuit of *ecm* leaving the mechanism in such a condition that if the hand lever is moved to a running position in either ahead or astern direction, the engine will be automatically started as described above, that is the various parts of the mechanism will have returned to the positions shown in Fig. X, Fig. XI and Fig. XII.

The above description covers only the automatic starting of engine in ahead direction. Corresponding parts for astern direction are provided and are designated the same except that *b* is used as the last designating letter instead of *a*, and the mode of operation should be perfectly clear from an inspection of the drawings without further description. It should be noted that hand lever will have no starting stations SA and SB and cannot be moved beyond station FA and FB, stops not shown being provided to accomplish this, while maneuvering crank shaft O will proceed beyond FA to SA as described. While the constructions shown are considered preferable, it is obvious from the nature of the invention that many different kinds and arrangements of equivalent mechanism can be used. In arrangement of stations, the starting sections may be on either side of corresponding running sections, by making, if necessary, some changes in arrangement of mechanism such as a mechanical switch, when starting section is between running and reversing sections, so that starting mechanism will not operate when actuating member moves from running to reversing sections. There is a difference of opinion as to what constitutes good practice, in matter of commencing fuel feed simultaneously with starting of engine or later, which as a bearing on arrangement chosen.

It is obvious that a centrifugal governor arranged to act when the engine has first attained a predetermined velocity of rotation can be used as a releasing mechanism for throwing out the starting mechanism instead of the translation device shown.

Such a releasing mechanism is illustrated in elevation in Fig. XVII. It consists of the shaft *msa* driven as before described in connection with Fig. X. Upon this shaft is mounted the gear *msb* driving gear *msc* mounted upon shaft *msd*. Fixedly mounted upon this shaft *msd* is a governor frame 200 carrying fulcrum pins 201, 202, upon which turn the governor weights 203 and 204. The weights are connected by a pair of springs of which one 205 is visible. The governor 203 is connected through pin 206 mounted upon an arm integral with governor weight, links 207 and 208 to the visible branch of each of the forked lever 209 and 210, respectively. The governor weight 204 is similarly connected to the branch of each of the same forked links which is situated behind the visible branch and behind the shaft *msd*. These connections compel both governor weights and both forked links to move in unison. The forked links are fulcrumed at 211 and 212 and connected to links 213 and 214 respectively.

The tension of the governor springs 205 is adjusted so that the centrifugal force of governor weights will overcome the resistance of the springs when the engine has acquired a predetermined turning velocity when first started sufficient to insure running with fuel when the supply of starting air is cut off. When the resistance of the springs is thus overcome by the centrifugal force of the governor weights, the latter will move outward and cause the links 213 and 214 to move downward, acting respectively with ahead and astern starting upon the control shown also in Fig. XVII and subsequent figures and to be described later. It is evident this centrifugal releasing device can be substituted for the translating releasing device shown on Fig. X to operate the corresponding links *nsa* and *nsb* of control shown in same and subsequent figures.

An alternate arrangement is illustrated in Figs. XVII–XXII, in which for simplicity and clearness only parts are shown which are different from those shown in preceding figures except a few parts necessary for an understanding of the mechanism which are designated by same letters and figures as heretofore. Parts for astern motion are omitted for the same reasons.

In Fig. XVII the arm *mjx* is similar to *mj'* in Fig. X with the extension *mjc* omitted. The levers 214 and 215 both fulcrumed at 216 and held normally in position shown by spring 217 form a one way tripping device, which acts when arm *mjx* enters the running section between station RA and FA but is unaffected when arm passes station RA in leaving the running section. The lever 215 is connected by link 218 to switch 219 which is arranged similarly to *smka* in Fig. X except the contact springs *enma* and *ensa* are reversed in position. It will be understood that contact spring *enma* is in series with the primary circuit contacts *ea* or *eb* as before described for the follow-up control mechanism and that contact spring *ensa* is in a secondary control circuit which drives the motor for moving *mjx* clockwise independently. It will also be understood that a contact spring similar to *ensa* is at the opposite side of casing *b* (not shown) for closing a secondary circuit which will drive the motor and arm *mjx* anti-clockwise for corresponding reverse maneuvers. The function of contact spring *era* and *mjr* is the same as previously described. This switch 219 is fulcrumed at 220 and is connected through link 221 to pin 222. This latter pin is on link 213 connected with the releasing device, and is also connected through link 223 to forked lever 224 fulcrumed at 225 and held normally against stop 226 by spring 227 attached to casing *b*. A latch lever 228 pivoted on fulcrum 231 is engageable with forked lever 224 and is operative by arm *mjx* and held normally against stop 229 by spring 230 again also attached to casing *b*. The operation of this arrangement of control is as follows:

When the hand control lever, not shown in these views but understood to be operating in conjunction with arm *mjx* as in Fig. X, is being moved to an ahead running station, and the follow-up control mechanism previously described causes the arm *mjx* to follow it, the position of arm *mjx* about to enter running section RA toward FA is represented in Fig. XVII, with *enma* in contact and the primary circuit of the follow-up control mechanism in action as heretofore described in connection with Fig. X. Fig. XVIII shows arm *mjx* after entering said running section and having tripped the one way device composed of levers 214 and 215 causing switch 219 to engage contact *ensa* and as heretofore cause arm *mjx* to proceed independently to starting station SA, the latch lever 228 at same time engaging lever 224 as already described and serving to hold contact spring *ensa* in contact.

Fig. XIX shows the arrangement when arm *mjx* has arrived at starting station SA having engaged fork of lever 224 and operating on latch lever 228 to release the forked lever 224. The engagement with forked lever causes the latter and the switch 229 to assume a neutral position with any tendency of arm *mjx* to overrun in either direction corrected by closing of the contact spring *enma* or *ensa* on switch 219.

Fig. XX shows effect of action of the releasing device upon starting of engine which lowers position of link 213 and causes contact spring *enma* to engage switch 219 thereby throwing in the primary follow-up control mechanism.

Fig. XXI shows resultant action of the follow-up control mechanism in causing arm *mjx* to dissengage from forked lever 224 in moving towards running position to which hand control lever has been moved. It will be noted that the consequent movement of forked lever 224 is not sufficient to cause latch lever 228 to engage the latter, and the contact spring *enma* still remains in engagement.

Fig. XXII shows arm *mjx* after reaching position of hand control lever assumed to be at FA with corresponding normal running of engine.

When the hand control lever is moved through station RA for a further maneuver the one way trip lever 214 will yield by reason of spring 217 and not affect switch 219, and all parts assume positions shown in Fig. XVII.

It is obvious then in case of the derangement of any of the control devices described or in case they fail to function from other causes independent emergency controls such as are installed for safety in actual construction but not shown, may usually be used to secure any maneuvers desired. This emergency control may consist of a simple arrangement of switches for electric drive or of valves if a pneumatic or hydraulic drive is used, acting to cut out the regular controls and give an independent direct manual control of either the regular prime mover or additional sources of power. The correct timing and sequence of the manual operation of this emergency control may be secured by visual observation of the movements of the various mechanisms. Direct manual drives are also usual in actual construction. These necessarily are slow in operation on larger sizes since they must comprise a reduction gearing to give sufficient power for manual operation, but which will serve in almost every case of severe derangement or breakage of the apparatus.

Claims:

1. A combination of mechanisms for maneuvering internal combustion reversing engines comprising, several individual maneuvering mechanisms for effecting distinct maneuvering operations for said engine, a plurality of trains of mechanisms, each train arranged to combine a plurality of wrist plate motions in series, and an actuating member connected to said several trains of mechanism and having a range of movement during different parts of which a movment is produced at the remote end of one train while simultaneously substantially no movement is produced at the remote end of another train, each of said trains of mechanism being connected at its remote end to one or more of said individual maneuvering mechanisms.

2. A combination of mechanisms for maneuvering internal combustion reversing engines comprising several individual maneuvering mechanisms for effecting distinct maneuvering operations for said engine, a plurality of trains of mechanisms, each train arranged to combine a plurality of wrist plate motions in series, and an actuating members connected to said several trains of mechanism, and having a range of movement during different parts of which a movement is produced at the remote end of one train while simultaneously substantially no movement is produced at the remote end of said other trains, the mechanism of one or more trains being partly in common with one or more of the other trains, each of said trains of mechanism being connected at its remote end to one or more of said individual maneuvering mechanisms.

3. The arrangement set forth in claim 1 in which each train of mechanism includes a plurality of rocking levers connected in series by links so that each of several levers swings a successive lever with a wrist plate motion effect.

4. The combination with an internal combustion reversing engine, of maneuvering mechanism therefore comprising, an actuating member having a range through different sections of movement for effecting the different maneuvers of starting, varying the fuel feed for changing the speed, and of operating the phase reversing mechanism for said engine, a plurality of trains of mechanism connected with said actuating member, said trains acting to transmit separate movements each at a different period during the full range of movement of said actuating member so as to effect said different maneuvers in proper sequence and without interference, the initial connecting member of each of said trains being pivotally connected to said actuating member.

5. The arrangement set forth in claim 4 in which said trains of mechanism are three or more in number, one train acting to transmit a movement for effecting the starting maneuver, one or more trains acting to transmit movements for effecting the maneuver of operating the phase reversing mechanism for said engine, and one train acting to transmit a movement for effecting the variation in fuel feed.

6. The arrangement set forth in claim 4 in combination with a manually operated handle, power driving means with follow-up control mechanism therefor to cause said actuating member to follow movements of said handle.

7. The combination with an internal combustion reversing engine, of maneuvering mechanism therefor comprising, an actuating member having a range of movement to different positions for effecting the different maneuvers of starting, varying the fuel feed for changing the speed and operate the phase reversing mechanism for said engine, a plurality of trains of mechanism connected with said actuating member, each of said trains of mechanism consisting of a plurality of rocking levers and links connected in series so that each of several levers swings a successive lever with a wrist plate motion effect, said trains acting to transmit separate movements each at a different period during the full range of movement of said actuating member so as to effect said different maneuvers in proper sequence and without interference.

8. The arrangement set forth in claim 7 in combination with a manually operated handle, power driving means with follow-up control mechanism therefor to cause said actuating member to follow movements of said handle.

9. The combination with an internal combustion reversing engine, of maneuvering mechanism therefor comprising, an actuating member having a range through different sections of movement for effecting the different maneuvers of starting, varying the fuel feed for changing the speed, and of operating phase reversing mechanism for said engine, a plurality of trains of mechanism connected with said actuating member, said trains acting to transmit separate movements each at a different period during the full range of movement of said actuating member so as to effect said different maneuvers in proper sequence and without interference, the initial connecting member of each of said trains being pivotally connected to said actuating member, a manually operated handle, power driving means with follow up control mechanism therefor to cause said actuating member to follow movements of said handle, said manually operated handle being movable to different stations corresponding to stopping and running at various fuel feeds or speeds of said engine, and means actuated by said handle in moving from a stopping station to a running station to cause said actuating member to move first to its starting position and then to the running position corresponding to the running station location of said handle.

10. The arrangement set forth in claim 4 in which said actuating member is movable to different positions, at both sides of an intermediate section of its movement, for starting and varying the fuel feed for either ahead or astern operation of said engine, the movement of said actuating member through said intermediate section serving to operate the phase reversing mechanism for said engine.

11. The combination with an internal combustion reversing engine, of maneuvering mechanism therefor comprising, an actuating member having a range through different sections of movement for effecting the different maneuvers of starting, varying the fuel feed for changing the speed, and of operating phase reversing mechanism for said engine, three or more trains of mechanism each having its initial member pivotally connected to said actuating member, one train acting to transmit a movement for effecting the starting maneuver, one or more trains acting to transmit movements for operating the phase reversing mechanism, and one train acting to transmit a movement for effecting the variation of fuel feed, said trains acting to transmit separate movements each at a different period during the full range of movement of said actuating member so as to effect said different maneuvers in proper sequence and without interference, said actuating member being movable to different positions, at both sides of an intermediate section of its movement for starting and varying the fuel feed for either ahead or astern operation of said engine, the movement of said actuating member through said intermediate section serving to operate the phase reversing mechanism for said engine.

12. The combination with an internal combustion reversing engine, of a variable fuel feed mechanism, a fuel valve for admitting said fuel during a fractional part of the engine stroke, a phase reversing mechanism, and a mechanism operatively controlled by both said phase reversing mechanism and said fuel feed mechanism to vary the fractional part of said engine stroke during which said fuel is admitted for both ahead and astern motion.

13. The combination with an internal combustion engine, of maneuvering mechanism for effecting the operations of starting, varying the fuel feed and stopping said engine comprising, a single handle movable to different stations corresponding to the stopping and running of said engine at different speeds, and means controlled by said handle whereby the movement of said handle from a stopping station to a running station will automatically effect the maneuver of first starting the engine and then operating the same at the speed indicated by the station location of said handle.

14. The combination with an internal combustion reversing engine, of maneuvering mechanisms for effecting the operations of starting, varying the speed, stopping, and phase reversing for said engine comprising, a single handle movable to different stations corresponding to the stopping and running of said engine at different speeds for its ahead motion and to similar different stations for its astern motion, and means controlled by said handle whereby the movement of said handle from a running station for one direction of engine motion to a running station for an opposite direction of engine motion will automatically effect the maneuvers in proper sequence of stopping, phase reversing, restarting, and finally operating said engine at the speed indicated by the latter station location of said handle.

15. The combination with an internal combustion reversing engine, of a variable fuel feed mechanism to vary the amount of fuel supplied to said engine, a fuel valve for admitting said fuel during a fractional part of the engine stroke, a phase reversing mechanism for said engine, and means comprising a floating lever device connected with both said phase reversing mechanism and said variable fuel feed mechanism to vary the fractional part of said stroke during which said fuel is admitted to correspond with a variation in the amount of fuel feed for both ahead and reverse operations of said engine.

16. The arrangement set forth in claim 15 in combination with a manually operated adjusting device to change the ratio between said variation of fuel feed and the variation in the fractional part of said stroke during which it is admitted.

17. The arrangement set forth in claim 15 in combination with a manual member operable independently of the variation in the fuel feed for varying the fractional part of said engine stroke during which said fuel is admitted.

18. The combination with a four cycle internal combustion reversing engine having for each cylinder, a starting valve and operating and phase changing mechanism therefor, running valves, and operating and phase changing mechanism therefor, a variable fuel feed mechanism, a cam shaft carrying cams for working said valves in proper phase for either ahead or reverse operation of said engine, a maneuvering mechanism for said engine comprising, an actuating member having a predetermined range of movement, and a plurality of trains of mechanism pivotally connected therewith for transmitting separate movement therefrom each during a different period in said range of movement, one train acting to control said variable fuel feed mechanism during one period, a second train acting to place said running valve operating mechanism in or out of engagement with said cam shaft at a different period, and a third train acting to shift said cam shaft at a still different period and while the operating mechanisms for said valves are out of engagement so as to change the positions of said cams for ahead or astern operation of said engine.

19. The combination with a four cycle internal combustion reversing engine having for each cylinder, a starting valve and operating and phase changing mechanism therefor, running valves and operating and phase changing mechanism therefor, a variable fuel feed mechanism, a cam shaft carrying cams for working said valves in proper phase for either ahead or reverse operation of said engine, a maneuvering mechanism for said engine comprising, an actuating member having a predetermined range of movement, and a plurality of trains of mechanism pivotally connected therewith for transmitting separate movement therefrom each during a different period in said range of movement, one train acting to control said variable fuel feed mechanism during one period, a second train acting to place said running valve operating mechanism in or out of engagement with said cam shaft at a different period, a third train acting to shift said cam shaft at a still different period and while the operating mechanisms for said valves are out of engagement so as to change the positions of said cams for ahead or astern operation of said engine, and a fourth train acting to place said starting valve operating mechanism in or out of engagement with said cam shaft at a still different period.

20. The combination with a four cycle internal combustion reversing engine having for each cylinder, a starting valve and operating and phase changing mechanism therefor, running valves and operating and phase changing mechanism therefor, a variable fuel feed mechanism, a cam shaft carrying cams for working said valves in proper phase for either ahead or reverse operation of said engine, a maneuvering mechanism for said engine comprising, an actuating member having a predetermined range of movement, and a plurality of trains of mechanism pivotally connected therewith for transmitting separate movement therefrom each during a different period in said range of movement, one train acting to control said variable fuel feed mechanism during one period, a second train acting to place said running valve operating mechanism in or out of engagement with said cam shaft at a different period, a third train acting to shift said cam shaft at a still different period and while the operating mechanisms for said valves are out of engagement so as to change the positions of said cams for ahead or astern operation of said engine, and a fourth train partly in common with said first train acting to place said starting valve operating mechanism in or out of engagement with said cam shaft at a still different period.

21. The arrangement set forth in claim 19 in combination with a starting air supply valve, and means operated from said actuating member to open the same only after said starting valve operating mechanism has been placed in engagement with said cam shaft.

22. Maneuvering mechanism for engines comprising, a control handle movable to different stations for stopping and running said engine at various speeds, a power driven actuating member movable to corresponding stations for effecting said maneuvers and also to an additional station for a further maneuver, follow-up mechanism for said power driven actuating member serving to move the same to any station corresponding to that of the handle, and means acting when said handle moves from its stopping station to any running station, to move said actuating member first to its additional station and then to the station corresponding to that assumed by said handle.

23. Maneuvering mechanism for engines comprising, a control handle movable to different stations for stopping and running said engine at various speeds, a power driven actuating member movable to corresponding stations for effecting said maneuvers and also to a starting station for the further maneuver of starting said engine, follow-up mechanism for said power driven actuating member serving to move the same to any station corresponding to that of the handle, and means acting when said handle moves from its stopping station to any running station, to move said actuating member first to its starting station, and then to the station corresponding to that assumed by said handle.

24. The arrangement set forth in claim 23 in combination with engine controlled devices to hold said actuating member in its starting station for a predetermined number of rotations of the engine crank shaft.

25. Maneuvering mechanism for engines comprising, a control handle movable to different stations for stopping and running said engine at various speeds, a power driven actuating member movable to corresponding stations for effecting said maneuvers and also to a starting station for the further maneuver of starting said engine, follow-up mechanisms for said power driven actuating member serving to move the same to any station corresponding to that of the handle, said follow-up mechanism comprising a primary control circuit operative to make the actuating member follow the movement of said handle, and a secondary control circuit operative to move said actuating member to its starting station independent of the movement of said handle.

26. The arrangement set forth in claim 25 in combination with devices to close said secondary control circuit and open said primary control circuit when said actuating member passes from a stopping to a running station.

27. Maneuvering mechanism for engines comprising, a control handle movable to different stations for stopping and running said engine at various speeds, a power driven actuating member movable to corresponding stations for effecting said maneuvers and also to a starting station for the further manueuver of starting said engine, follow-up mechanism for said power driven actuating member serving to move the same to any station corresponding to that of the handle, said follow-up mechanism comprising a primary control circuit operative to make the actuating member follow the movement of said handle, a secondary control circuit operative to move said actuating member to its starting station independent of the movement of said handle, devices to close said secondary control circuit and open said primary control circuit when said actuating member passes from a stopping to a running station, devices to open both of said circuits when said actuating member reaches its starting station, and devices operated after a predetermined number of rotations of the engine crank shaft while said actuating member is in its starting position to reclose said primary control circuit.

28. In combination with an internal combustion reversing engine, a single manually operated control handle having a range of movement in which is located one or more stop stations, one or two running sections each comprising a series of stations corresponding to running said engine at various graduated speeds for ahead or astern motion, and a section corresponding to the phase reversing operation for said engine, maneuvering mechanism for stopping, reversing the operating phase, starting and varying the fuel feed for controlling speed of engine, said handle being movable directly to the station appropriate to the stopping or running of said engine at speed and direction desired, and means controlled by said movement of said handle for causing the corresponding maneuvering mechanisms to effect the appropriate maneuvers in proper sequence and without interference, to secure either stopping, or running of said engine, with either ahead or astern motion, at such speed, as will correspond to the station to which said handle has been moved.

29. The arrangement set forth in claim 28 in combination with means actuated by said handle when moving into a running section, to effect operation of the starting mechanism, also a releasing mechanism actuated by the rotation of said engine during said starting operation for throwing out said starting mechanism and causing the variable fuel feed mechanism to assume a position corresponding to the running station location of said handle.

30. In combination with an internal combustion reversing engine, a single manually operated control handle having a range of movement in which is located one or more stop stations, one or two running sections each comprising a series of stations corresponding to running said engine at various graduated speeds for ahead or astern motion, and a section corresponding to the phase reversing operation for said engine, maneuvering mechanism for stopping, reversing the operating phase, starting and varying the fuel feed for controlling speed of engine, said handle being movable directly to the station appropriate to the stopping or running of said engine at speed and direction desired, means controlled by said movement of said handle for causing the corresponding maneuvering mechanisms to effect the appropriate maneuvers in proper sequence and without interference, to secure either stopping, or running of said engine, with either ahead or astern motion, at such speed, as will correspond to the station to which said handle has been moved, including means actuated by said handle when moving into a running section, to effect operation of the starting mechanism, and a releasing mechanism actuated by the rotation of said engine after a predetermined number of revolutions of said engine after starting for throwing out said starting mechanism and causing the variable fuel feed mechanism to assume a position corresponding to the running station location of said handle.

31. In combination with an internal combustion reversing engine, a single manually operated control handle having a range of movement in which is located one or more stop stations, one or two running sections each comprising a series of stations corresponding to running said engine at various graduated speeds for ahead or astern motion, and a section corresponding to the operation of phase changing mechanism for reversing said engine, maneuvering mechanisms for stopping, phase changing, starting and varying the fuel feed for controlling the speed of said engine, an actuating member connected to said stopping, said phase changing, said starting and said variable fuel feed control mechanisms and having stations and sections in its range of movement corresponding to those of said handle and in addition to the stations and sections to which said control handle is movable, a starting station and section adjacent and corresponding to each of its running sections, and a power driving means with follow-up control mechanism therefor, to cause said actuating member to follow movements of said handle, said actuating member when about to enter a running section acting to render said follow-up control inoperative and a secondary control operative to cause said actuating member to move to and stop at said adjacent starting station to thereby effect the operation of the starting mechanism for said engine.

32. In combination with an internal combustion reversing engine, a single manually operated control handle having a range of movement in which is located one or more stop stations, one or two running sections each comprising a series of stations corresponding to running said engine at various graduated speeds for ahead or astern motion, and a section corresponding to the operation of phase changing mechanism for reversing said engine, maneuvering mechanisms for stopping, phase changing, starting and varying the fuel feed for controlling the speed of said engine, an actuating member connected to said stopping, said phase changing, said starting and said variable fuel feed control mechanisms and having stations and sections in its range of movement corresponding to those of said handle and in addition to the stations and sections to which said control handle is movable, a starting station and section adjacent and corresponding to each of its running sections, a power driving means with follow up control mechanism therefor, to cause said acutating member to follow movements of said handle, said actuating member when about to enter a running section acting to render said follow up control inoperative and a secondary control operative to cause said actuating member to move to and stop at said adjacent starting station to thereby effect the operation of the starting mechanism for said engine, and a releasing mechanism actuated by the rotation of said engine during said starting operation for rendering inoperative said secondary control and restoring said follow up control for said actuating member and cause the same to assume a position corresponding to the running station location of said handle.

33. The arrangement as set forth in claim 31 in combination with means for causing said actuating member in following said handle when passing beyond said running section to restore the said follow-up control and said secondary control to the status existing before said actuating member entered said running section.

34. The combination with an internal combustion reversing engine of one or more maneuvering mechanisms for effecting each of the maneuvers of phase reversing, and of varying the fuel feed for running said engine at various speeds with either ahead or astern motion, an actuating member having a range of movement divided into sections, each corresponding to one of the said maneuvers, connecting trains of mechanism from said actuating member to the said maneuvering mechanisms for causing the latter to effect said maneuvers, said connecting trains being arranged to transmit the motion of said actuating member to each of said maneuvering mechanisms only while the motion of said actuating member is within the said corresponding section, said connecting train of mechanism for said varying fuel feed mechanism being pivotally connected to said actuating member and being so disposed as to permit the use of the same train for running of said engine with either ahead or astern motion.

35. The arrangement as set forth in claim 34 in combination with a maneuvering mechanism for effecting the starting of said engine with ahead or astern motion, and in which the movement of the actuating member includes an additional section or sections (within each of which is located a starting station) corresponding to the said maneuver of starting said engine, with either ahead or astern motion, and a connecting train for said maneuvering mechanism for starting disposed so that the same train may serve for starting engine with either ahead or astern motion, said connecting trains for said variable fuel feed mechanism being partly in common with the connecting train for said starting mechanism.

36. The arrangement as set forth in claim 34 in which the section or group of sections corresponding to the maneuver of phase reversing, occupy an intermediate position in the said extreme movement of said actuating member, stations corresponding to any maneuvers for ahead motion being located at one side, and stations corresponding to any maneuver for astern motion being located at the other side of said reversing section or sections.

37. The combination with an internal combustion reversing engine of several maneuvering mechanisms for effecting each of the maneuvers of starting said engine with ahead or astern motion, operating phase reversing mechanism and varying the fuel feed for running said engine at various speeds in either ahead or astern motion, an actuating member having a range of movement divided into sections corresponding to: one, starting said engine with ahead motion: two, starting said engine with astern motion; three, running said engine with ahead motion; four, running said engine with astern motion; five, phase reversing mechanism for said engine, said starting sections each having a station located therein corresponding to the starting of said engine and said running sections each having stations located therein corresponding to various running speeds of said engine, said phase reversing section occupying an intermediate position in the extreme movement of said actuating member, stations corresponding to any maneuver for ahead motion being located at one side and stations corresponding to any maneuver for astern motion being located at the other side of said phase reversing section, connecting trains of mechanism from said actuating member to said maneuvering mechanisms for causing the latter to effect said maneuvers, said connecting trains being arranged to transmit motion of said actuating member to each of said maneuvering mechanisms only while the motion of said actuating member is within the corresponding section, said connecting train of mechanism for said varying fuel feed mechanism being pivotally connected to said actuating member and being so disposed as to permit the use of the same train for running of said engine with either ahead or astern motion, and a connecting train for said maneuvering mechanism for starting said engine disposed so that the same train may serve for starting said engine with either ahead or astern motion, said connecting train for said variable fuel feed mechanism being partly in common with the connecting train for said starting mechanism.

38. In combination with an internal combustion reversing engine, a variable fuel feed mechanism, a fuel valve mechanism comprising a cam roller and cam for opening a fuel valve during a fractional part of the engine stroke, a mechanism for changing the phase of said valve operating cam for ahead or astern motion of said engine, means comprising a floating lever device connected with both said variable fuel speed mechanism and said phase changing mechanism, said means acting at beginning of the fuel valve opening to give locus of positions for said cam roller along and substantially tangent to the entering face of said fuel cam, whereby the fractional part of said engine stroke during which fuel is admitted is varied with the amount of fuel feed, for either ahead or astern motion of said engine.

39. The combination with an internal combustion reversing engine of one or more maneuvering mechanisms for effecting each of the maneuvers of phase reversing, and varying the fuel feed for running said engine at various speeds with either ahead or astern motion, an actuating member having a range of movement divided into sections, each corresponding to one of the said maneuvers, the section or group of sections corresponding to the maneuver of phase reversing, occupying an intermediate position in the said extreme movement of said actuating member, stations corresponding to any maneuvers for ahead motion being located at one side, and stations corresponding to any maneuver for astern motion being located at the other side of said reversing section or sections, connecting trains of mechanism from said actuating member to the said maneuvering mechanisms for causing the latter to effect said maneuvers, said connecting trains being arranged to transmit the motion of said actuating member to each of said maneuvering mechanisms only while the motion of said actuating member is within the said corresponding section, said connecting train of mechanism for said varying fuel feed mechanism being pivotally connected to said actuating member and being so disposed as to permit the use of the same train for running of said engine with either ahead or astern motion, the train leading to the phase reversing mechanism which effects the maneuver corresponding to the centralmost section being pivotally connected to said actuating member, so that the initial transmission of motion by said train is in a direction substantially parallel to the motion of said pivotal connection while in said centralmost section.

40. In an internal combustion reversing engine in combination, a variable fuel feed mechanism, a fuel valve for admitting said fuel during a fractional part of the engine stroke, a phase reversing mechanism for said engine, a mechanism operatively controlled by both said phase reversing mechanism and said fuel feed mechanism to vary the fractional part of said engine stroke during which said fuel is admitted for both ahead and astern motion, one or more maneuvering mechanisms for effecting each of the maneuvers of phase reversing, and varying the fuel feed for running said engine at various speeds with either ahead or astern motion, an actuating member having a range of movement divided into sections, corresponding to said different maneuvers, the section or sections corresponding to the maneuver of phase reversing occupying an intermediate position in the extreme movement of said actuating member, the section corresponding to the maneuvers for ahead motion of said engine being located at one side of said phase reversing section or sections, and the section corresponding to the maneuver for astern motion of said engine being located at the other side of said phase reversing section or sections, connecting trains of mechanism from said actuating member to the said maneuvering mechanisms for causing the latter to effect said maneuvers, said connecting trains being arranged to transmit the motion of said actuating member to said maneuvering mechanisms only while the motion of said actuating member is within the said corresponding sections, the connecting train of mechanism for effecting the maneuver of varying the fuel feed being pivotally connected to said actuating member and being so disposed that said same train may serve for varying said fuel feed in running said engine with either ahead or astern motion and the connection train of mechanism to said phase reversing mechanism for effecting the maneuver corresponding to the centralmost section being pivotally connected to said actuating member so that the initial transmission of motion by said train is in a direction substantially parallel to the motion of said pivotal connection while in said centralmost section.

In testimony whereof I have affixed my signature.

JAMES A. SEYMOUR.